US012245660B2

(12) United States Patent
Sussmann

(10) Patent No.: US 12,245,660 B2
(45) Date of Patent: Mar. 11, 2025

(54) SYSTEMS AND METHODS FOR MANUFACTURING AN ARTICLE OF FOOTWEAR

(71) Applicant: PUMA SE, Herzogenaurach (DE)

(72) Inventor: Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 137 days.

(21) Appl. No.: 17/886,770

(22) Filed: Aug. 12, 2022

(65) Prior Publication Data
US 2023/0046685 A1 Feb. 16, 2023

Related U.S. Application Data

(60) Provisional application No. 63/232,928, filed on Aug. 13, 2021.

(51) Int. Cl.
A43B 23/04 (2006.01)
A43B 1/04 (2022.01)
A43B 13/12 (2006.01)
A43B 23/02 (2006.01)
B33Y 80/00 (2015.01)

(52) U.S. Cl.
CPC .............. A43B 23/042 (2013.01); A43B 1/04 (2013.01); A43B 13/125 (2013.01); A43B 23/0245 (2013.01); B33Y 80/00 (2014.12)

(58) Field of Classification Search
CPC ....... A43B 23/042; A43B 1/04; A43B 13/125; B33Y 80/00
USPC ............................................................ 36/45
See application file for complete search history.

(56) References Cited

U.S. PATENT DOCUMENTS

| 2014/0020192 A1* | 1/2014 | Jones | B33Y 10/00 12/146 B |
| 2016/0206044 A1* | 7/2016 | Dimoff | A43B 13/122 |
| 2019/0150552 A1* | 5/2019 | Casillas | A43B 23/0215 |
| 2021/0145128 A1* | 5/2021 | Bruce | A43B 23/0205 |

FOREIGN PATENT DOCUMENTS

| EP | 2874798 A2 | 5/2015 |
| EP | 3374155 A1 | 9/2018 |
| EP | 3552510 A1 | 10/2019 |
| EP | 3585200 A1 | 1/2020 |
| WO | 2018218122 A1 | 11/2018 |

OTHER PUBLICATIONS

International Search Report and Written Opinion of International Application No. PCT/IB2022/057566, mailed Nov. 7, 2022 (17 pages).

* cited by examiner

Primary Examiner — Timothy K Trieu
(74) Attorney, Agent, or Firm — Quarles & Brady LLP

(57) ABSTRACT

An article of footwear includes a sleeve formed by a knit material and defining a front distal end and a rear distal end. The sleeve includes an external surface and an internal surface that defines an internal cavity. The article of footwear includes a midsole arranged within the internal cavity, and a framework printed, layer by layer, onto portions of the external surface. The framework includes a plurality of segments and an outsole. The outsole being arranged on a bottom portion of the external surface and the plurality of segments extend along the external surface of the sleeve between the front distal end and the rear distal end.

15 Claims, 18 Drawing Sheets

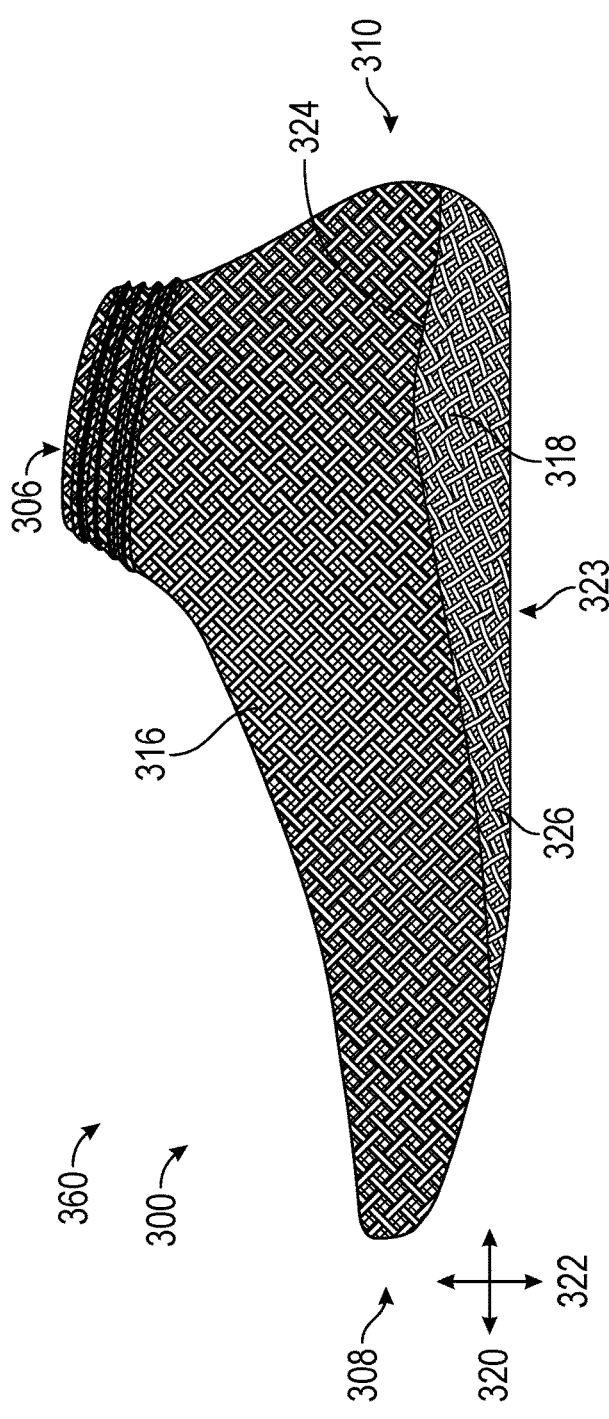
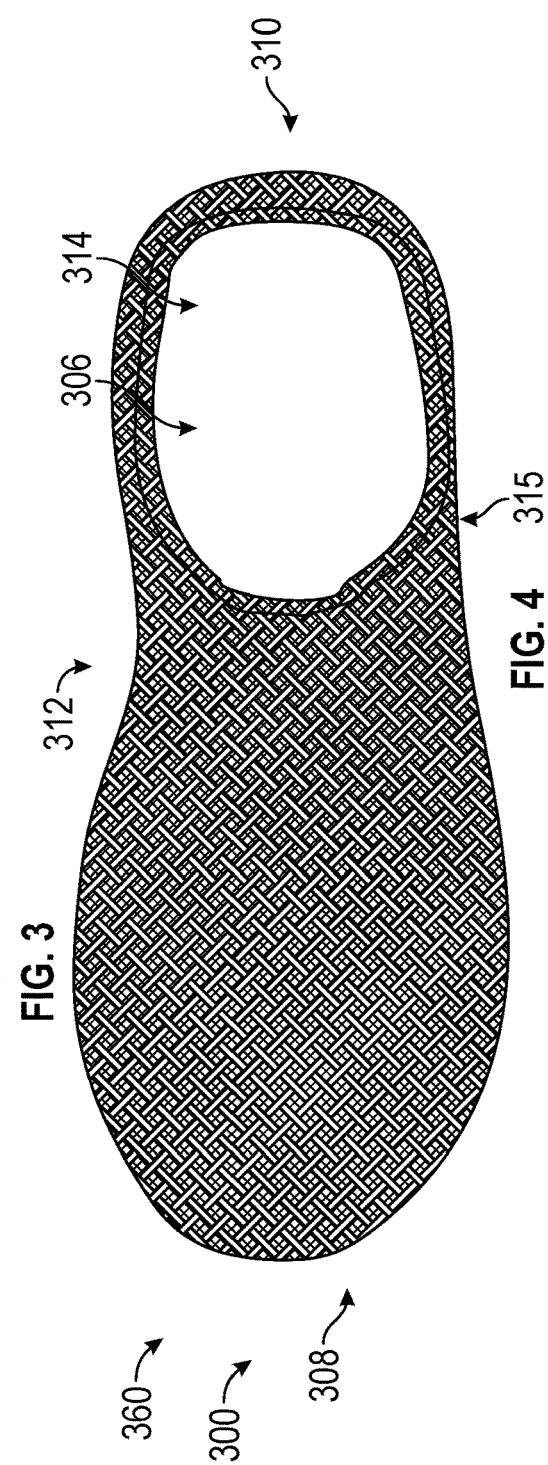

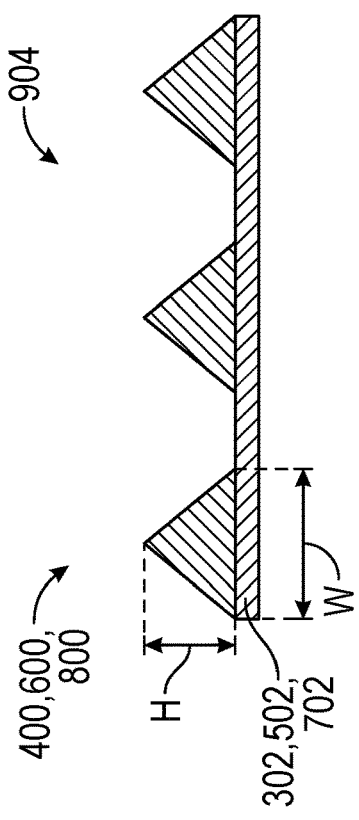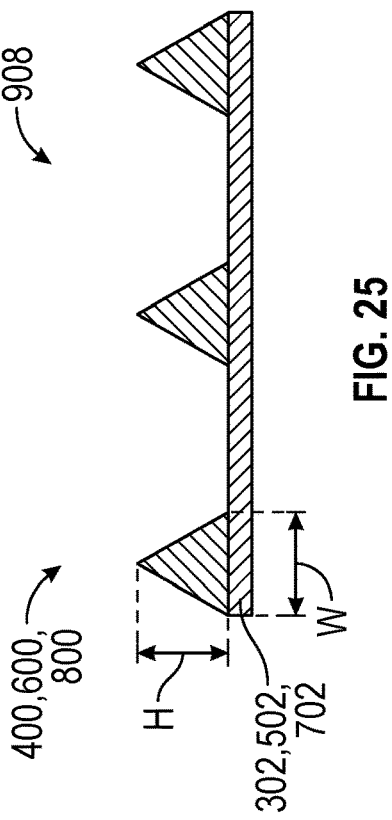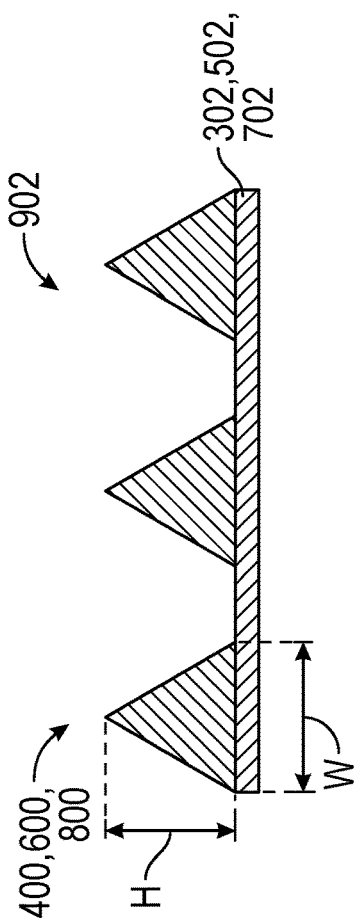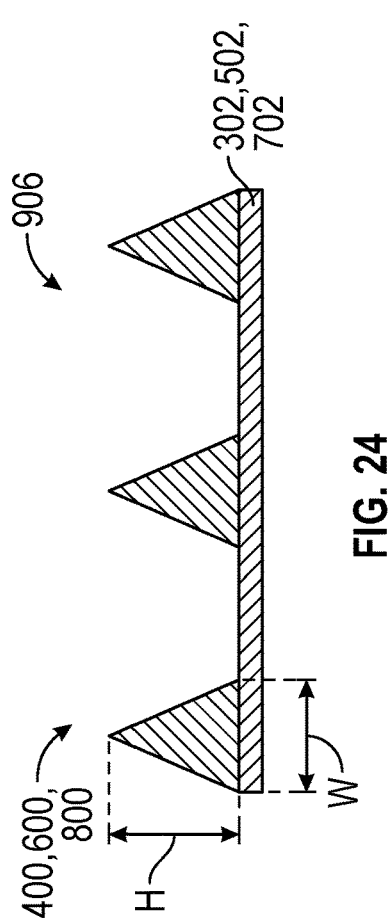

SYSTEMS AND METHODS FOR MANUFACTURING AN ARTICLE OF FOOTWEAR

CROSS REFERENCE TO RELATED APPLICATIONS

This application claims the benefit of and priority to U.S. Provisional App. No. 63/232,928, filed on Aug. 13, 2021, which is herein incorporated by reference in its entirety.

REFERENCE REGARDING FEDERALLY SPONSORED RESEARCH OR DEVELOPMENT

Not applicable.

SEQUENCE LISTING

Not applicable.

BACKGROUND

1. Field of the Invention

The present disclosure relates generally to systems and methods for manufacturing an article of footwear.

2. Description of the Background

Many conventional shoes or articles of footwear generally comprise an upper and a sole attached to a lower end of the upper. Conventional shoes further include an internal space, e.g., a void or cavity, which is created by interior surfaces of the upper and the sole, that receives a foot of a user before securing the shoe to the foot. The sole is typically attached to a lower surface of the upper and is positioned between the upper and the ground. In some instances, the sole may include multiple components, such as an outsole, a midsole, and an insole. The outsole may provide traction to a bottom surface of the sole, and the midsole may be attached to an inner surface of the outsole.

SUMMARY

An article of footwear, as described herein, may have various configurations. In some embodiments, the article of footwear includes a sleeve or sock and a midsole that is arranged within the sleeve or sock. In general, the sleeve or sock may be formed by a knitted or woven material and that encloses the midsole. A framework is printed, layer by layer, onto selective external portions of the sleeve or sock to reinforce the sleeve or sock. The framework may include an outsole that is printed, layer by layer, onto a bottom external portion or a sole side of the sleeve or sock. The design of the article of footwear allows the midsole and the sleeve or sock to be manufactured as separate components and assembled in a customized fashioned (e.g., the same sleeve/sock may be able to accommodate differently designed midsoles), and the framework may be printed onto the sleeve or sock via an additive manufacturing process, which further provides customization options to the manufactured article of footwear (e.g., location of the reinforcement provided by the framework, amount of reinforcement provided by the framework, design of the framework and the integrally formed outsole, etc.). This improved customization allows for articles of footwear to be manufactured with improved manufacturing efficiency, when compared with conventional manufacturing techniques, and provides improved performance characteristics to an end user wearing the article of footwear (e.g., cushioning, energy return, stability, etc.).

In some embodiments, the present disclosure provides an article of footwear that includes a sleeve formed by a knit material and defining a front distal end and a rear distal end. The sleeve includes an external surface and an internal surface that defines an internal cavity. The article of footwear includes a midsole arranged within the internal cavity, and a framework printed, layer by layer, onto portions of the external surface. The framework includes a plurality of segments and an outsole. The outsole being arranged on a bottom portion of the external surface and the plurality of segments extend along the external surface of the sleeve between the front distal end and the rear distal end.

In some embodiments, the present disclosure provides an article of footwear that includes an upper including an upper portion and a midsole portion. The upper portion is fabricated from a first knit material and the midsole portion is fabricated from a second knit material. The article of footwear includes a midsole arranged within the upper, a framework printed, layer by layer, onto the upper, and an outsole printed, layer by layer, onto a sole side of the upper. The framework defines a matrix pattern including row segments and column segments that extend along an external medial side of the upper and an external lateral side of the upper. The outsole is connected to the framework at the external medial side and the external lateral side.

In some embodiments, the present disclosure provides a method of manufacturing an article of footwear. The method includes forming an upper from a knit material, inserting a last into an internal cavity defined by the upper so that the last engages an internal surface of the upper and supports an external surface of the upper, printing, layer by layer, a framework onto portions of the external surface defined by the upper, and printing an outsole, layer by layer, on a sole side of the external surface of the upper. The method further includes removing the last from the internal cavity of the upper and inserting a midsole into the internal cavity of the upper.

In some embodiments, the present disclosure provides a method of manufacturing an article of footwear. The method includes forming a sleeve from a knit material. The sleeve includes an external surface that defines a front distal end and a rear distal end. The method further includes inserting a last into an internal cavity of the sleeve and printing, layer by layer, a framework onto portions of the external surface of the sleeve. The framework includes a plurality of segments and an outsole. The outsole being arranged on a bottom portion of the external surface and the plurality of segments extending along the external surface of the sleeve from the front distal end to the rear distal end. The method further includes removing the last from the internal cavity of the sleeve, printing, layer by layer, a midsole, and inserting the midsole into the internal cavity of the sleeve.

In some aspects, an article of footwear includes a sleeve that is formed by a knit material and defines a front distal end and a rear distal end. The sleeve includes an external surface and an internal surface that defines an internal cavity. A midsole is arranged within the internal cavity and a framework is printed, layer by layer, onto portions of the external surface. The framework includes a plurality of segments and an outsole that is arranged on a bottom portion of the external surface. In addition, the plurality of segments extend along the external surface of the sleeve between the front distal end and the rear distal end. The sleeve includes an aperture through which a portion of the midsole is visible.

Other aspects of the articles of footwear or portions of the articles of footwear described herein, including features and advantages thereof, will become apparent to one of ordinary skill in the art upon examination of the figures and detailed description herein. Therefore, all such aspects of the articles of footwear are intended to be included in the detailed description and this summary.

BRIEF DESCRIPTION OF THE DRAWINGS

FIG. 3 is a lateral side view of a sleeve or upper according to one embodiment of the present disclosure;

FIG. 4 is a top plan view of the sleeve or upper of FIG. 3;

FIG. 22 is a schematic illustration of a set of segments;

FIG. 23 is a schematic illustration of a set of segments with a reduced height;

FIG. 24 is a schematic illustration of a set of segments with a reduced width;

FIG. 25 is a schematic illustration of a set of segments with a reduced height and a reduced width;

DETAILED DESCRIPTION OF THE DRAWINGS

The following discussion and accompanying figures disclose various embodiments or configurations of a shoe or an article of footwear. Although embodiments are disclosed with reference to a shoe, such as a running shoe, tennis shoe, basketball shoe, etc., concepts associated with embodiments of the shoe may be applied to a wide range of footwear and footwear styles, including basketball shoes, cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The present disclosure is directed to an article of footwear and/or specific components or portions of the article of footwear, such as a midsole, an outsole or a sole structure. The article of footwear may include an upper, sleeve or sock that is at least partially formed from a knit material, a woven textile, a braided component and/or a combination of one or more of the aforementioned materials. The knit material may be made by knitting of yarn, the woven textile by weaving of yarn, and the braided component may be made by braiding. Knit textiles or materials include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. The upper, sleeve, or sock may comprise a variety of materials, such as a first knit material or yarn, a second knit material or yarn, and/or a third knit material or yarn, which may have varying properties or varying visual characteristics.

Figure 1:
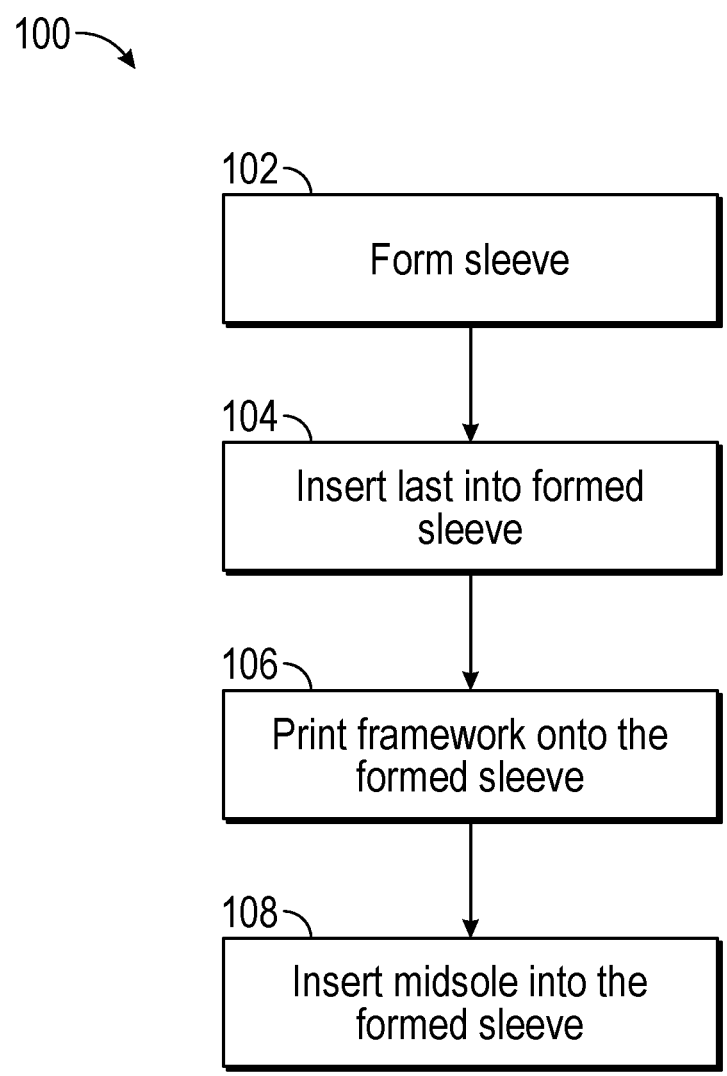
FIG. 1 is a flowchart outlining a method for manufacturing an article of footwear according to one aspect of the present disclosure.

FIG. 1 illustrates a method 100 for manufacturing an article of footwear (e.g., a shoe) according to one embodiment of the present disclosure. In some embodiments, a portion of the method may be carried out using a controller that includes a processor and memory, and some portions of the method may be performed by an additive manufacturing system (e.g., a 3D printer). In some embodiments, the controller may be integrated into the additive manufacturing system. In other embodiments, the controller may be located remotely from the additive manufacturing system and may be in wireless communication with the additive manufacturing system.

The method 100 may initiate at step 102 by forming a sleeve or an upper. The sleeve or upper may be formed or manufactured by a knitting, weaving, or braiding process from a knit, woven, or braided material. In some embodiments, the sleeve or upper may be formed entirely from one or more knit materials. In general, the sleeve or upper may be formed in the general shape of a sock that is wearable by a user.

In some embodiments, the sleeve or upper may define a front distal end, a rear distal end, an external surface, an internal surface, and an opening. The internal surface may form an internal cavity within which a foot of a user may be received. The opening may provide access to the internal cavity. The sleeve may include an upper portion and a midsole portion. The midsole portion may at least partially extend over a bottom portion of the external surface. In some embodiments, the sleeve or upper may be fabricated from a single knit material. In some embodiments, the sleeve or upper may be fabricated from more than one material. For example, the knit material of the sleeve or upper may comprise a first knit material that spans the upper portion and a second knit material that spans the midsole portion. Accordingly, the forming of the sleeve or upper at step 102 may comprise forming the upper portion of the sleeve or upper from the first knit material and forming the midsole portion of the upper or sleeve from the second knit material.

In general, the sleeve or upper may be formed so that a midsole that may be inserted into the internal cavity during manufacture of the article of footwear is at least partially visible. For example, in some embodiments, the second knit material may be at least partially transparent so that a portion of a midsole received within the sleeve or upper is externally visible through the midsole portion of the sleeve. In some embodiments, the second knit material may be a transparent monofilament knit or yarn material. In some embodiments, the sleeve or upper may include an aperture through which a portion of the midsole is visible.

Figure 5:
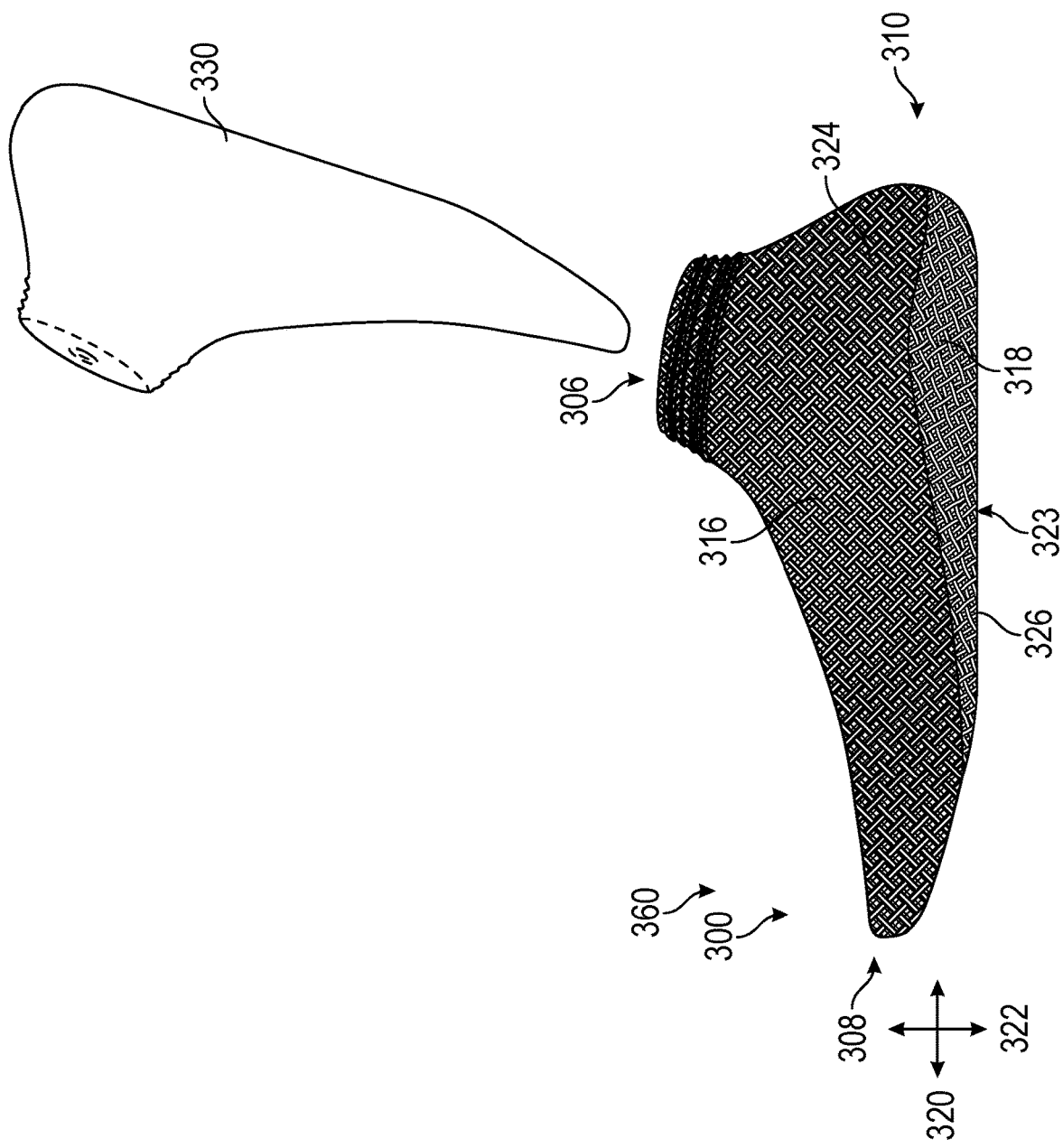
FIG. 5 is a lateral side view of the sleeve or upper of FIG. 3 and a last.

After the sleeve or upper is formed at step 102, a last is inserted into the internal cavity of the sleeve or upper at step 104 (see, e.g., FIG. 5). The last may be inserted into the internal cavity of the sleeve or upper so that the last engages the internal surface of the sleeve or upper and supports the external surface of the sleeve or upper. For example, a volume defined by the last may be greater or equal to than a resting or unsupported internal volume of the internal cavity (e.g., a volume with no components inserted into or in engagement with the upper), which ensures that the last fills the internal cavity and engages the internal surface when the last is inserted into the internal cavity. In some embodiments, a volume and shape of the last may define the production-intent size and shape of the article of footwear.

In general, forming the sleeve or upper from one or more knit materials may allow the manufacture to be more efficient, when compared to the manufacture of conventional uppers, and the batch size (i.e., the number of uppers produced in a batch) is not limited by the manufacturing process. While the use of one or more knit materials provides several manufacturing benefits, the structural integrity of the upper or sleeve may require reinforcement to form a stabilized sleeve or upper. For example, at step 106, a framework is printed, layer by layer, onto the external surface of the upper or sleeve. In some embodiments, the framework may be printed layer by layer onto the external surface by an additive manufacturing system (e.g., a 3D printer). The various methods of additive manufacturing used to manufacture the framework on a portion of the sleeve or upper according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photo-polymerization, sheet lamination, or electron beam freeform fabrication (EBF3).

In general, the framework may be printed onto selective portions of the external surface of the sleeve or upper to reinforce and stabilize the sleeve or upper. In some embodiments, the framework may define a matrix pattern that includes a plurality of segments. The plurality of segments may extend along the external surface of the sleeve or upper from the front distal end to the rear distal end. In some embodiments, the plurality of segments may be arranged on both an external medial side of the sleeve or upper and an external lateral side of the sleeve or upper.

The plurality of segments may include row segments or a first set of lines and column segments or a second set of lines. In some embodiments, the row segments may be arranged along portions of the external surface so that the row segments are generally parallel to one another, and the column segments may be arranged along portions of the external surface so that the column segments are generally parallel to one another. The generally parallel arrangement of the row segments and the column segments does not limit the shape of the row segments and the column segments to straight segments. For example, the row segments and/or the column segments may define straight segments, curved segments, wavy segments, or any other shape. In some embodiments, the row segments may not be generally parallel to one another and may be aligned or extend in a common direction. For example, the row segment may extend in a general direction from the front distal end to the rear distal end (e.g., a heel-toe direction). Similarly, in some embodiments, the column segments may not be generally parallel to one another and may be aligned or extend in a common direction. For example, the column segments may extend in a general direction that intersects the row segments, or in a general direction from the external medial side to the external lateral side. In some embodiments, the row segments may interconnect with and intersect the column segments to form a crisscross pattern.

In general, the row segments may be spaced from one another and the column segments may be spaced from one another. In some embodiments, a row spacing defined between adjacent pairs of the row segments may be approximately equal. In some embodiments, a row spacing defined between adjacent pairs of the row segments may vary from a row spacing minimum to a row spacing maximum. In some embodiments, a ratio between the row spacing maximum and the row spacing minimum may be between about 1 and about 5, or between about 1 and about 4, or between about 1 and about 3, or between about 2 and about 4. In some embodiments, the row spacing defined between the individual row segments in an adjacent pair of row segments may vary in addition to or as an alternative of the row spacing varying between adjacent pairs of the row segments.

In some embodiments, a column spacing defined between adjacent pairs of the column segments may be approximately equal. In some embodiments, a column spacing defined between adjacent pairs of the column segments may vary from a column spacing minimum to a column spacing maximum. In some embodiments, a ratio between the column spacing maximum and the column spacing minimum may be between about 1 and about 5, or between about 1 and about 4, or between about 1 and about 3, or between about 2 and about 4. In some embodiments, the column spacing defined between the individual column segments in an adjacent pair of column segments may vary in addition to or as an alternative of the column spacing varying between adjacent pairs of the column segments.

In some embodiments, each of the plurality of segments defines a shape and size that may remain about constant over the framework. For example, the plurality of segments each may define a segment height and a segment width. In some embodiments, the segment heights and the segment widths may be about equal.

In some embodiments, the segment heights, the segment widths, and/or the segment shapes may vary over selective portions of the external surface to provide increased or decreased stability/reinforcement to the sleeve or upper. For example, the segment height and/or the segment width may be increased in portions of the external surface to provide increased stability/reinforcement. Alternatively or additionally, a shape of the segments may vary (e.g., transition from triangular in cross-section to round or semicircular in cross-section) to provide increased stability/reinforcement. In some embodiments, the segment heights may vary from a minimum segment height to a maximum segment height. For example, the maximum segment height between about 1 and about 5 times larger than the minimum segment height, or between about 1 and about 4 times larger than the minimum segment height, or between about 1 and about 3 times larger than the minimum segment height, or between about 2 and about 4 times larger than the minimum segment height. The ranges between the maximum segment height and the minimum segment height described herein maintain a critical balance between increased and/or decreased stability/reinforcement while maintaining a pleasing aesthetic for the article of footwear.

In some embodiments, the segment widths may vary from a minimum segment widths to a maximum segment widths. For example, the maximum segment widths between about 1 and about 5 times larger than the minimum segment widths, or between about 1 and about 4 times larger than the minimum segment widths, or between about 1 and about 3 times larger than the minimum segment widths, or between about 2 and about 4 times larger than the minimum segment widths. The ranges between the maximum segment widths and the minimum segment widths described herein maintain a critical balance between increased and/or decreased stability/reinforcement while maintaining a pleasing aesthetic for the article of footwear.

In some embodiments, the plurality of segments may include a first segment with a first segment height at a first location on the external surface, a second segment with a second segment height at a second location on the external surface, and a third segment with a third segment height at a third location on the external surface. In some embodiments, the second segment height is greater than the first segment height and the third segment height. In some embodiments, the third segment height is greater than the second segment height, and the second segment height is greater than the first segment height.

In some embodiments, the plurality of segments include a first segment with a first segment width at a first location on the external surface, a second segment with a second segment width at a second location on the external surface, and a third segment with a third segment width at a third location on the external surface. In some embodiments, the second segment width is greater than the first segment width and the third segment width. In some embodiments, the third segment width is greater than the second segment width, and the second segment width is greater than the first segment width.

In some embodiments, the framework may include an outsole that is printed, layer by layer, onto the bottom portion of the external surface or a sole side of the sleeve or upper. Accordingly, the step 106 may comprise printing the framework, layer by layer, on the sleeve or upper and printing the outsole, layer by layer, onto the bottom portion of the external surface or a sole side of the sleeve or upper. In some embodiments, the outsole may be fabricated from the same material as the plurality of segments. For example, the outsole may be formed integrally with the framework. In some embodiments, the outsole may be fabricated from a different material than the plurality of segments. In some embodiments, the outsole may be connected to the framework at the external medial side and the external lateral side of the sleeve or upper.

In some embodiments, the framework as a whole may be printed layer by layer at step 106. For example, one layer of the entire framework (e.g., the outsole and the plurality of segments) may be printed at a time until all of the layers of the framework have been printed onto the portions of the external surface. In some embodiments, portions of the framework may be printed layer by layer prior to other portions of the framework being printed layer by layer. For example, the outsole may be printed layer by layer and then the plurality of segments may be printed layer by layer, or vice versa.

With continued reference to FIG. 1, once the framework is printed at step 106, the last may be removed from the internal cavity of the sleeve or upper, and a midsole may be inserted into the internal cavity at step 108. The combination of the sleeve or upper and the midsole arranged therein may form the article of footwear. In some embodiments, an insole or sock liner may be inserted into the internal cavity in addition to the midsole.

In general, forming the reinforced sleeve or upper separately from the midsole allows for various sleeves/uppers to be combined with different midsoles to provide selective cushioning properties, with the only requirement being that the midsole is sized to fit (e.g., made for the same sized shoe) as the reinforced sleeve or upper.

Figure 2:
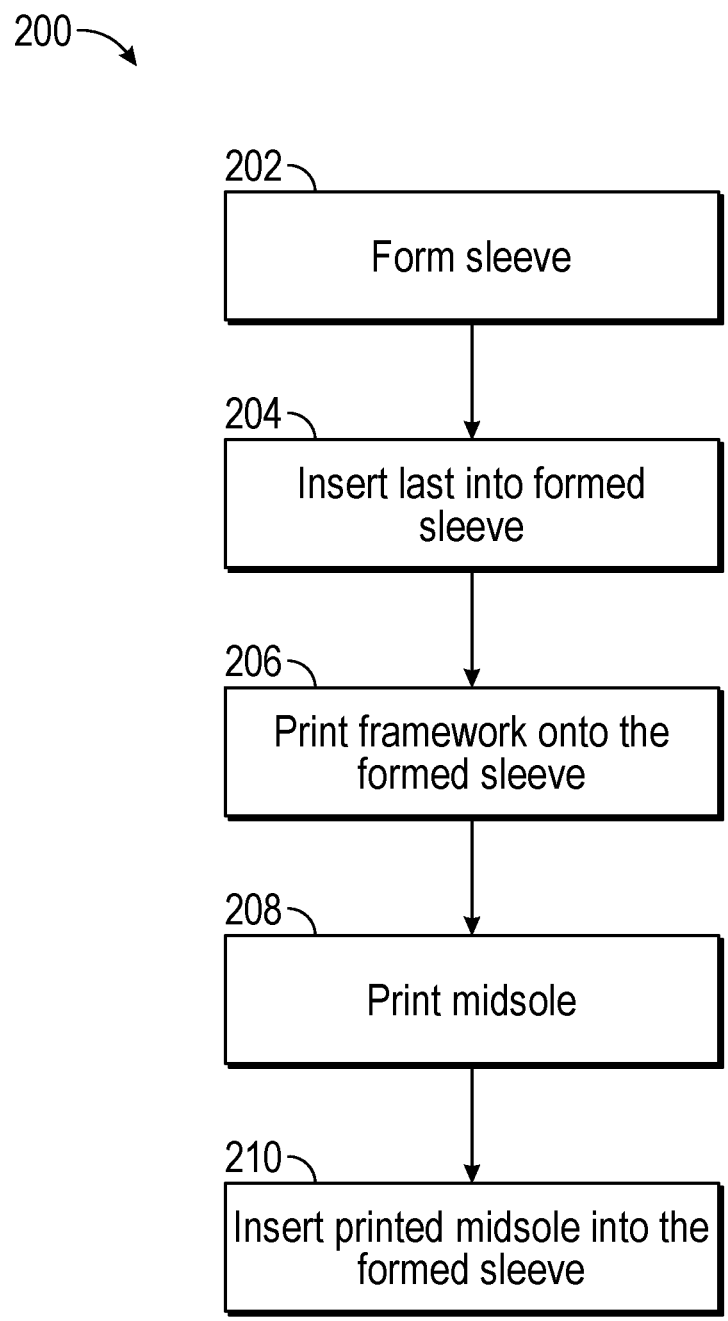
FIG. 2 is a flowchart outlining a method for manufacturing an article of footwear according to another aspect of the present disclosure.

FIG. 2 illustrates a method 200 for manufacturing an article of footwear (e.g., a shoe) according to one embodiment of the present disclosure. Similar to the method 100, the method 200 may initiate at step 202 by forming a sleeve or an upper. The sleeve or upper may be formed or manufactured by a knitting, weaving, or braiding process from a knit, woven, or braided material. In some embodiments, the sleeve or upper may be formed entirely from one or more knit materials. In general, the sleeve or upper may be formed in the general shape of a sock that is wearable by a user.

In some embodiments, the sleeve or upper may define a front distal end, a rear distal end, an external surface, an internal surface, and an opening. The internal surface may form an internal cavity within which a foot of a user may be received. The opening may provides access to the interior cavity. The sleeve may include an upper portion and a midsole portion. The midsole portion may at least partially extend over a bottom portion of the external surface. In some embodiments, the sleeve or upper may be fabricated from a single knit material. In some embodiments, the sleeve or upper may be fabricated from more than one material. For example, the knit material of the sleeve or upper may comprise a first knit material that spans the upper portion and a second knit material that spans the midsole portion. Accordingly, the forming of the sleeve or upper at step 202 may comprise forming the upper portion of the sleeve or upper from the first knit material and forming the midsole portion of the upper or sleeve from the second knit material.

In general, the sleeve or upper may be formed so that a midsole that may be inserted into the internal cavity during manufacture of the article of footwear is at least partially visible. For example, in some embodiments, the second knit material may be at least partially transparent so that a portion of a midsole received within the sleeve or upper is externally visible through the midsole portion of the sleeve. In some embodiments, the second knit material may be a transparent monofilament knit or yarn material. In some embodiments, the sleeve or upper may include an aperture through which a portion of the midsole is visible.

After the sleeve or upper is formed at step 202, a last is inserted into the internal cavity of the sleeve or upper at step 204 (see, e.g., FIG. 5). The last may be inserted into the internal cavity of the sleeve or upper so that the last engages the internal surface of the sleeve or upper and supports the external surface of the sleeve or upper. For example, the volume of the last may be greater than a resting or unsupported volume of the sleeve or upper (e.g., a volume with no components inserted into or in engagement with the sleeve or upper), which ensures that the last expands and stretches the sleeve or upper when the last is inserted into the internal cavity. In some embodiments, a volume and shape of the last may define the production-intent size and shape of the article of footwear.

In general, forming the sleeve or upper from one or more knit materials may allow the manufacture to be more efficient, when compared to the manufacture of conventional uppers, and the batch size (i.e., the number of uppers produced in a batch) is not limited by the manufacturing process. While the use of one or more knit materials provides several manufacturing benefits, the structural integrity of the upper or sleeve may require reinforcement to form a stabilized sleeve or upper. For example, at step 206, a framework is printed, layer by layer, onto the external surface of the upper or sleeve. In some embodiments, the framework may be printed layer by layer onto the external surface by an additive manufacturing system (e.g., a 3D printer). The various methods of additive manufacturing used to manufacture the framework on a portion of the sleeve or upper according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photo-polymerization, sheet lamination, or electron beam freeform fabrication (EBF3).

In general, the framework may be printed onto selective portions of the external surface of the sleeve or upper to reinforce and stabilize the sleeve or upper. In some embodiments, the framework may define a matrix pattern that includes a plurality of segments. The plurality of segments may extend along the external surface of the sleeve or upper from the front distal end to the rear distal end. In some embodiments, the plurality of segments may be arranged on both an external medial side of the sleeve or upper and an external lateral side of the sleeve or upper.

The plurality of segments may include row segments or a first set of lines and column segments or a second set of lines. In some embodiments, the row segments may be arranged along portions of the external surface so that the row segments are generally parallel to one another, and the column segments may be arranged along portions of the external surface so that the column segments are generally parallel to one another. The generally parallel arrangement of the row segments and the column segments does not limit the shape of the row segments and the column segments to straight segments. For example, the row segments and/or the column segments may define straight segments, curved segments, wavy segments, or any other shape. In some embodiments, the row segments may not be generally parallel to one another and may be aligned or extend in a common direction. For example, the row segment may extend in a general direction from the front distal end to the rear distal end (e.g., a heel-toe direction). Similarly, in some embodiments, the column segments may not be generally parallel to one another and may be aligned or extend in a common direction. For example, the column segments may extend in a general direction that intersects the row segments, or in a general direction from the external medial side to the external lateral side. In some embodiments, the row segments may interconnect with and intersect the column segments to form a crisscross pattern.

In general, the row segments may be spaced from one another and the column segments may be spaced from one another. In some embodiments, a row spacing defined between adjacent pairs of the row segments may be approximately equal. In some embodiments, a row spacing defined between adjacent pairs of the row segments may vary from a row spacing minimum to a row spacing maximum. In some embodiments, a ratio between the row spacing maximum and the row spacing minimum may be between about 1 and about 5, or between about 1 and about 4, or between about 1 and about 3, or between about 2 and about 4. In some embodiments, the row spacing defined between the individual row segments in an adjacent pair of row segments may vary in addition to or as an alternative of the row spacing varying between adjacent pairs of the row segments.

In some embodiments, a column spacing defined between adjacent pairs of the column segments may be approximately equal. In some embodiments, a column spacing defined between adjacent pairs of the column segments may vary from a column spacing minimum to a column spacing maximum. In some embodiments, a ratio between the column spacing maximum and the column spacing minimum may be between about 1 and about 5, or between about 1 and about 4, or between about 1 and about 3, or between about 2 and about 4. In some embodiments, the column spacing defined between the individual column segments in an adjacent pair of column segments may vary in addition to or as an alternative of the column spacing varying between adjacent pairs of the column segments.

In general, each of the plurality of segments defines a shape and size that may remain about constant over the framework. For example, the plurality of segments each may define a segment height and a segment width. In some embodiments, the segment heights and the segment widths may be about equal.

In some embodiments, the segment heights, the segment widths, and/or the segment shapes may vary over selective portions of the external surface to provide increased or decreased stability/reinforcement to the sleeve or upper. For example, the segment height and/or the segment width may be increased in portions of the external surface to provide increased stability/reinforcement. Alternatively or additionally, a shape of the segments may vary (e.g., transition from triangular in cross-section to round or semicircular in cross-section) to provide increased stability/reinforcement. In some embodiments, the segment heights may vary from a minimum segment height to a maximum segment height. For example, the maximum segment height between about 1 and about 5 times larger than the minimum segment height, or between about 1 and about 4 times larger than the minimum segment height, or between about 1 and about 3 times larger than the minimum segment height, or between about 2 and about 4 times larger than the minimum segment height. The ranges between the maximum segment height and the minimum segment height described herein maintain a critical balance between increased and/or decreased stability/reinforcement while maintaining a pleasing aesthetic for the article of footwear.

In some embodiments, the segment widths may vary from a minimum segment widths to a maximum segment widths. For example, the maximum segment widths between about 1 and about 5 times larger than the minimum segment widths, or between about 1 and about 4 times larger than the minimum segment widths, or between about 1 and about 3 times larger than the minimum segment widths, or between about 2 and about 4 times larger than the minimum segment widths. The ranges between the maximum segment widths and the minimum segment widths described herein maintain a critical balance between increased and/or decreased stability/reinforcement while maintaining a pleasing aesthetic for the article of footwear.

In some embodiments, the plurality of segments may include a first segment with a first segment height at a first location on the external surface, a second segment with a second segment height at a second location on the external surface, and a third segment with a third segment height at a third location on the external surface. In some embodiments, the second segment height is greater than the first segment height and the third segment height. In some embodiments, the third segment height is greater than the second segment height, and the second segment height is greater than the first segment height.

In some embodiments, the plurality of segments include a first segment with a first segment width at a first location on the external surface, a second segment with a second segment width at a second location on the external surface, and a third segment with a third segment width at a third location on the external surface. In some embodiments, the second segment width is greater than the first segment width and the third segment width. In some embodiments, the third segment width is greater than the second segment width, and the second segment width is greater than the first segment width.

In some embodiments, the framework may include an outsole that is printed, layer by layer, onto the bottom portion of the external surface or a sole side of the sleeve or upper. Accordingly, the step 206 may comprise printing the framework, layer by layer, on the sleeve or upper and printing the outsole, layer by layer, onto the bottom portion of the external surface or a sole side of the sleeve or upper. In some embodiments, the outsole may be fabricated from the same material as the plurality of segments. For example, the outsole may be formed integrally with the framework. In some embodiments, the outsole may be fabricated from a different material than the plurality of segments. In some embodiments, the outsole may be connected to the framework at the external medial side and the external lateral side of the sleeve or upper.

In some embodiments, the framework as a whole may be printed layer by layer at step 106. For example, one layer of the entire framework (e.g., the outsole and the plurality of segments) may be printed at a time until all of the layers of the framework have been printed onto the portions of the external surface. In some embodiments, portions of the framework may be printed layer by layer prior to other portions of the framework being printed layer by layer. For example, the outsole may be printed layer by layer and then the plurality of segments may be printed layer by layer, or vice versa.

After printing framework, layer by layer, onto the formed sleeve or upper at step 206, a midsole may be printed, layer by layer, at step 208. In some embodiments, the midsole may be manufactured by an additive manufacturing system (e.g., a 3D printer). Manufacturing a midsole from an additive manufacturing system allows the formation or manufacture of a midsole with complex and customizable geometric features using a molding process that is not limited by midsole design. In some embodiments, the formed midsole may include geometric structures, such as an aperture, opening, a channel, a tunnel, void, or lattice structure formed in the midsole by the additive manufacturing system.

The use of the terms "lattice portion" or "lattice structure," herein refer to portions of a negative mold and/or a portion of an article of footwear (e.g., a midsole) formed by one of a plurality of interconnected segments, interconnected shapes, interconnected channels, interconnected openings, and/or interconnected surfaces. In some embodiments, a lattice structure or lattice portion may be formed integrally with a negative mold or a portion of an article of footwear by an additive manufacturing process. In some embodiments, the lattice structure or lattice portion may define at least one cutout, opening, aperture, or absence of material that is formed within a unit cell (e.g., a repeated pattern defined by the lattice structure). The use of a lattice structure within a negative mold and/or a portion of an article of footwear may allow various manufacturing and performance characteristics to be modified, improved, and/or customized. For example, a lattice structure or lattice portion may define a substantially reduced weight or density when compared to a solid material. It follows that the incorporation of a lattice structure or a lattice portion into a shoe or sole may reduce the overall volume or mass of material needed to manufacture an article of footwear. Further, a lattice structure or a lattice portion may include geometric features with improved cushioning properties, when compared to solid material, so the incorporation of a lattice structure or a lattice portion into a midsole may reduce overall weight and improve cushioning performance in an article of footwear.

In some embodiments, the lattice structure may define a unit cell that is formed by a cutout, air space, or absence of material defined between interconnected intersection points. For example, a lattice structure may define triangular-, spherical-, square-, rectangular-, or diamond-shaped unit cells. Alternatively or additionally, in some embodiments, at least a portion of the unit cells in a lattice structure according to the present disclosure may define a pentagonal shape, a hexagonal shape, or any other polygonal shape.

In some embodiments, a unit cell defined by a lattice structure according to the present disclosure can be formed by interconnected shapes (e.g., ovals, circles, or another geometric shape) with varying orientations to form a repeated pattern, or unit cell. In some embodiments, the lattice structure may define an auxetic cutout or pattern. In some embodiments, a lattice structure according to the present disclosure may be formed by a differential geometry structure. For example, a lattice structure according to the present disclosure may be formed by a gyroid structure that includes a plurality of interconnected, periodic minimal surfaces. The gyroid structure may define a unit cell that is repeated in a pattern over a particular volume to form a lattice structure according to the present disclosure. In general, the use of a differential geometry structure (e.g., a gyroid) may reduce stress concentrations formed along the lattice structure due to the reduction in sharp edges formed on the lattice structure, which may provide improved cushioning performance, for example, in a midsole of an article of footwear, when compared to solid material used in conventional midsoles.

After the midsole is printed layer by layer at step 208, the midsole is inserted into the internal cavity of the sleeve or upper at step 210, thereby forming the article of footwear. In some embodiments, an insole or sock liner may be inserted into the internal cavity in addition to the midsole.

In general, forming the reinforced sleeve or upper separately from the midsole allows for various sleeves/uppers to be combined with different midsoles to provide selective cushioning properties, with the only requirement being that the midsole is sized to fit (e.g., made for the same sized shoe) as the reinforced sleeve or upper. In addition, the additive manufacturing of the framework and the midsole provides enhanced customization of the support and cushioning properties of the manufactured article of footwear.

FIGS. 3 and 4 illustrate one embodiment of a sleeve or upper 300 that may be formed, for example, by the method 100 or the method 200. In the illustrated embodiments, the upper 300 includes an external surface 302, an internal surface 304, and an opening 306. The upper 300 defines a front distal end 308, a rear distal end 310, an external medial side 312, and an external lateral side 315. In general, the external surface 302 may extend over the exterior of the upper 300, and the internal surface 304 may form an internal cavity 314 within which a foot of a user may be received. The opening 306 may provide access to the internal cavity 314.

In the illustrated embodiment, the upper 300 includes an upper portion 316 and a midsole portion 318. In the illustrated embodiment, the upper portion 316 extends in a heel-toe direction 320 from the front distal end 308 to the rear distal end 310 of the upper 300. The upper portion 316 extends upwardly (e.g., from the perspective of FIG. 3) in a sole-instep direction 322 from an interface or border 324 defined between upper portion 316 and the midsole portion 318 to cover a remainder of the external surface 302. The midsole portion 318 may at least partially extend over a bottom portion 326 of the external surface 302. In other words, the midsole portion 318 may by arranged on a sole side 323 of the upper 300. The midsole portion 318 may extend upwardly (e.g., from the perspective of FIG. 3) in a sole-instep direction 322 from the bottom portion 326 of the external surface 302 and at least partially onto the external medial side 312 and the external lateral side 315 of the upper 300. In this way, for example, at least a portion of the midsole portion 318 may be externally viewable on the external medial side 312 and the external lateral side 315, which enables the midsole portion 318 to be at least partially viewable as the upper 300 is worn by a user. In some embodiments, the midsole portion 318 may extend in the heel-toe direction 320 from the rear distal end 310 to the front distal end 308. In some embodiments, the midsole portion 318 may extend in the heel-toe direction 320 from the rear distal end 310 to a location between the rear distal end 310 and the front distal end 308 (see, e.g., FIG. 9).

In some embodiments, the upper 300 may be fabricated from a single knit material. That is, the upper portion 316 and the midsole portion 318 may be fabricated from the same knit material. In the illustrated embodiment, the upper portion 316 may be fabricated from a first knit material and the midsole portion 318 may be fabricated from a second knit material that is different from the first knit material in at least one of color, transparency, or chemical composition. For example, the second knit material may be at least partially transparent so that a portion of a midsole is externally visible through the midsole portion 318 of the upper 300 (see, e.g., FIGS. 7-9). In some embodiments, the second knit material may be a transparent monofilament knit or yarn material.

In general, the specific properties that a particular type of yarn or knit material will impart to an area of a knitted component may at least partially depend upon the materials that form the various filaments and fibers of the yarn. For example, cotton may provide a soft effect, biodegradability, or a natural aesthetic to a knit material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component or material may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn or knit material and other aspects of the yarn or knit material may be selected to impart a variety of properties to particular areas of the upper 300.

In some embodiments, an elasticity of a knit material or structure fabricated from a knit material may be measured based on comparing a width or length of the knit structure in a first, non-stretched state to a width or length of the knit structure in a second, stretched state after the knit structure has a force applied to the knit structure in a lateral direction. As will be described herein, the upper 300 may also include additional structural elements to reinforce and/or stabilize selective portions of the upper 300. In some embodiments, the properties associated with the upper 300, e.g., a stitch type, a yarn type, or characteristics associated with different stitch types or yarn types, such as elasticity, aesthetic appearance, thickness, air permeability, transparency, or scuff-resistance, may be varied.

Turing to FIG. 5, a last 330 may be inserted into the upper 300 during a method or process in which the upper 300 is reinforced with a framework (see, e.g., the method 100 or the method 200). The last 330 may be inserted into the internal cavity 314 of the upper 300 so that the last 330 engages the internal surface 304 of the upper 300 and supports the external surface 302 of the upper 300. For example, a volume defined by the last 330 may be greater or equal to than a resting or unsupported internal volume of the internal cavity 314 (e.g., a volume with no components inserted into or in engagement with the upper 300), which ensures that the last 330 fills the internal cavity 314 and engages the internal surface 304 when the last 330 is inserted into the internal cavity 314. In this way, for example, the last 330 may be used as a mold for a production-intent shape and size of the upper 300, and may provide a rigid support for the upper 300 during the printing of the framework thereon. In some embodiments, a volume and shape of the last 330 may define the production-intent size and shape of the upper 300. In some embodiments, the last 330 and the corresponding upper 300 may be formed smaller than a production-intent size and shape. For example, in some embodiments, the last 330 and the corresponding upper 300 may be formed about 25%, or preferably about 20%, or more preferably about 15%, or in one instance about 10% smaller than a production-intent size and shape. In this way, for example, the upper 300 may be allowed to stretch, upon receipt of a user's foot, to automatically tighten around the foot.

Figure 6:
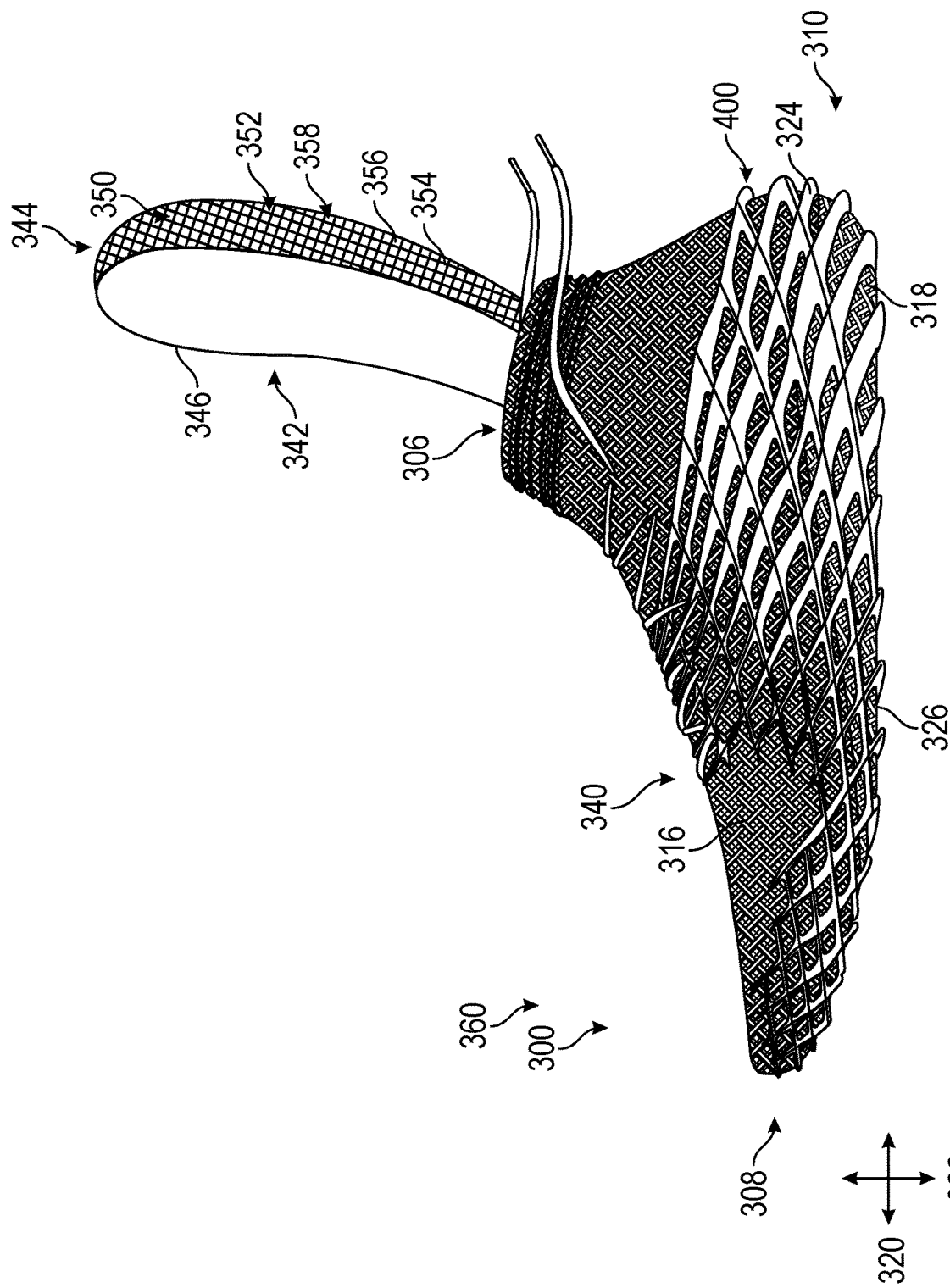
FIG. 6 is a lateral side view of the sleeve or upper of FIG. 3 with a framework printed thereon and a midsole being inserted therein.

FIG. 6 illustrates one embodiment of the upper 300 with a framework 340 printed on the external surface 302. After the framework 340 is printed on the upper 300, a midsole 342 is inserted into the internal cavity 314. In some embodiments, the midsole 342 may be fabricated from a thermoplastic material or foam (e.g., expanded thermoplastic urethane (ETPU), polyurethane, ethylene-vinyl acetate, or equivalents). The midsole 342 may be inserted through the opening 306 and arranged within the internal cavity 314 so that portions of the midsole 342 protrude through and/or are visible through the midsole portion 318 of the upper 300 (see, e.g., FIGS. 7-9).

In the illustrated embodiment, the midsole 342 includes a body 344 that defines an upper surface 346 and a peripheral boundary 350 formed around an outer periphery of the midsole 342. In the illustrated embodiment, the body 344 includes a lattice structure 352 with a unit cell 354 that is formed by interconnected surfaces or segments 356. In general, the lattice structure 352 formed in the midsole 342 may define one or more openings, voids, apertures, channels, and/or passages 358 that are formed by the interconnected surfaces or segments 356 and extend throughout the midsole 342. In some embodiments, the lattice structure 352 may define a gyroid structure that includes triply periodic minimal surfaces. In general, the use of a lattice structure 352 may reduce stress concentrations formed along the midsole 342 due to the reduction in sharp edges formed on the lattice structure 352, which may provide improved cushioning performance, for example, in the midsole 342.

In the illustrated embodiment, the lattice structure 352 extend from the upper surface 346 and extend laterally outwardly to the peripheral boundary 350. In this way, for example, the lattice structure 352 may be externally visible through the midsole portion 318 of the upper 300, when the article of footwear is assembled.

Figure 7:
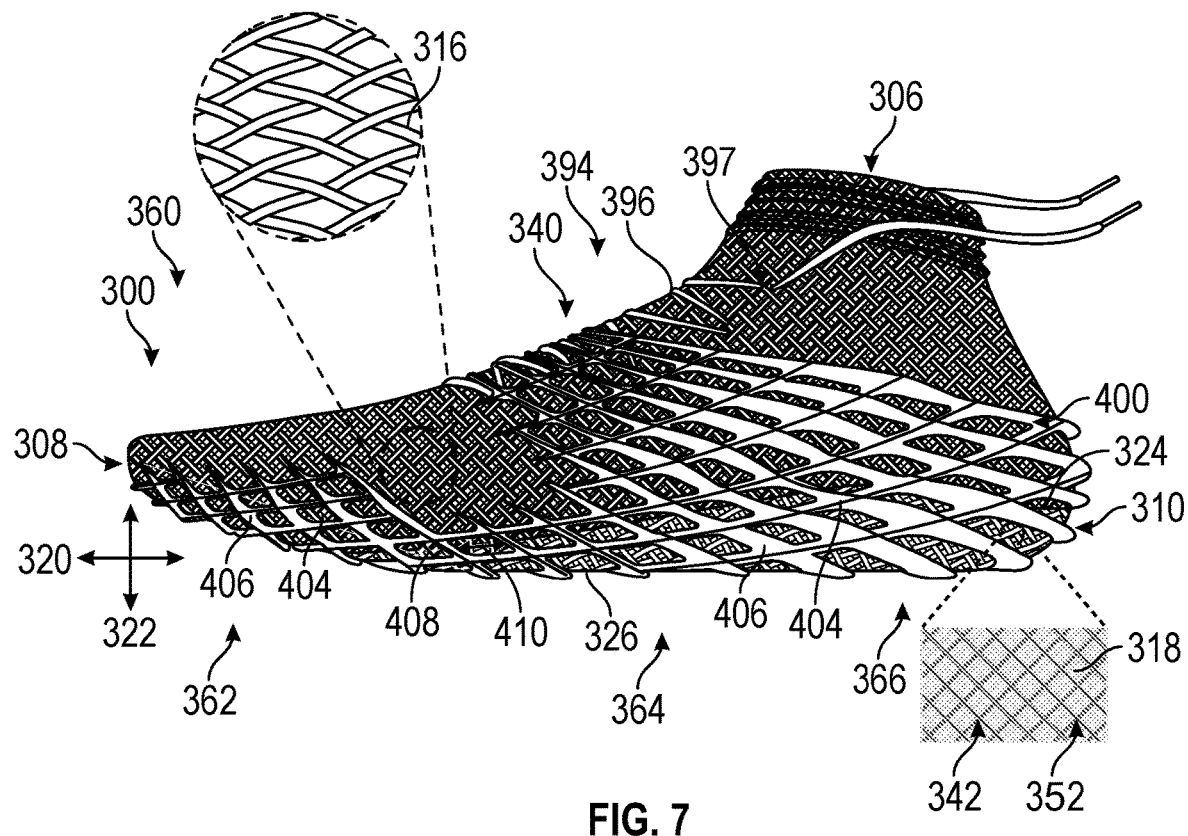
FIG. 7 is a lateral side view of an article of footwear including the sleeve or upper of FIG. 3.
Figure 8:
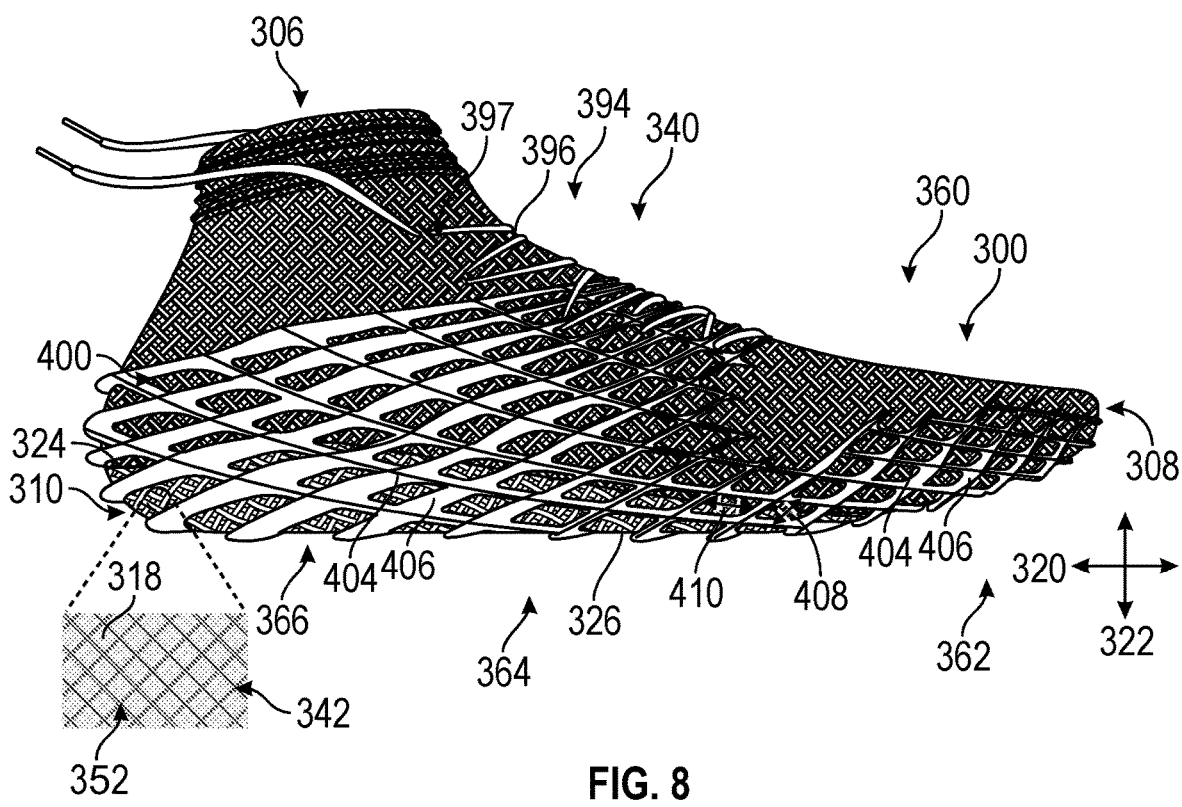
FIG. 8 is a medial side view of the article of footwear of FIG. 7.
Figure 9:
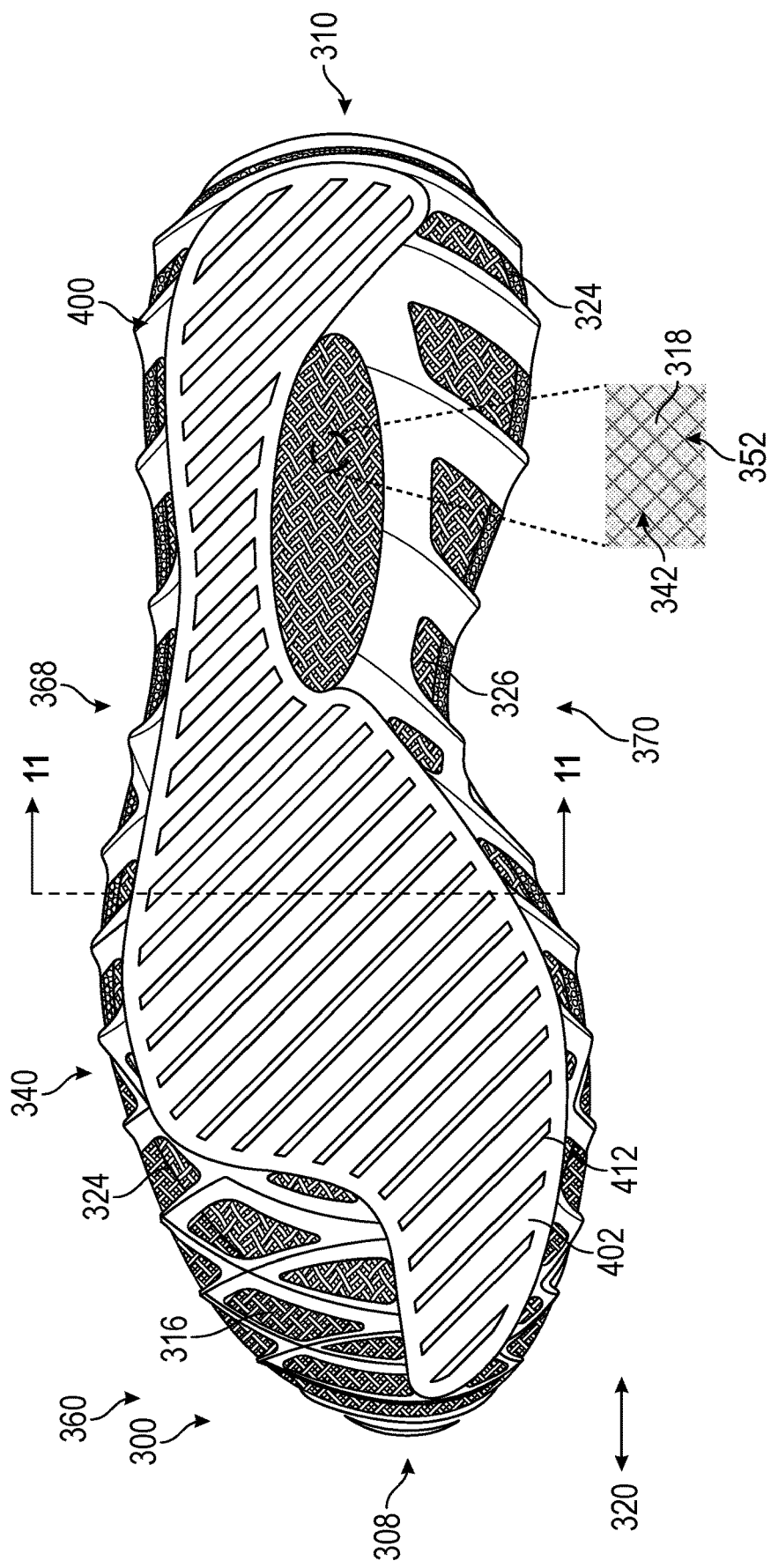
FIG. 9 is a bottom plan view of the article of footwear of FIG. 7.

FIGS. 7-11 illustrate one embodiment of an article of footwear 360 including the upper 300, the framework 340, and the midsole 342 arranged within the internal cavity 314. In some embodiments, the midsole 342 may be arranged within the internal cavity 314 and may be in engagement with the internal surface 304. The midsole 342 may be secured within the internal cavity 314 without the need for adhesives or other chemical or structural attachment mechanisms. As described herein, the midsole portion 318 may be transparent so that at least portion of the midsole 342 is externally visible through the midsole portion 318 of the upper 300 (see, e.g., FIGS. 7-9). In the illustrated embodiment, the dashed/dotted lines, or greyscale shading, in the zoomed in views of FIGS. 7-9 represent the midsole portion 318 of the upper 300 being transparent, for example, so that the lattice structure 352 of the midsole 342 is visible through the midsole portion 318 (e.g., in regions where the framework 340 doesn't cover the midsole portion 318).

The article of footwear 360 may be manufactured, for example, by the method 100 or the method 200. The article of footwear 360 may be included in a footwear assembly including a pair of shoes (e.g., a left-footed version of the article of footwear 360 and a right-footed version of the article of footwear 360). For ease of disclosure, a single shoe or article of footwear 360 will be referenced to describe aspects of the disclosure. In some figures, an article of footwear is depicted as a right shoe, and in some figures an article of footwear is depicted as a left shoe.

Figure 10:
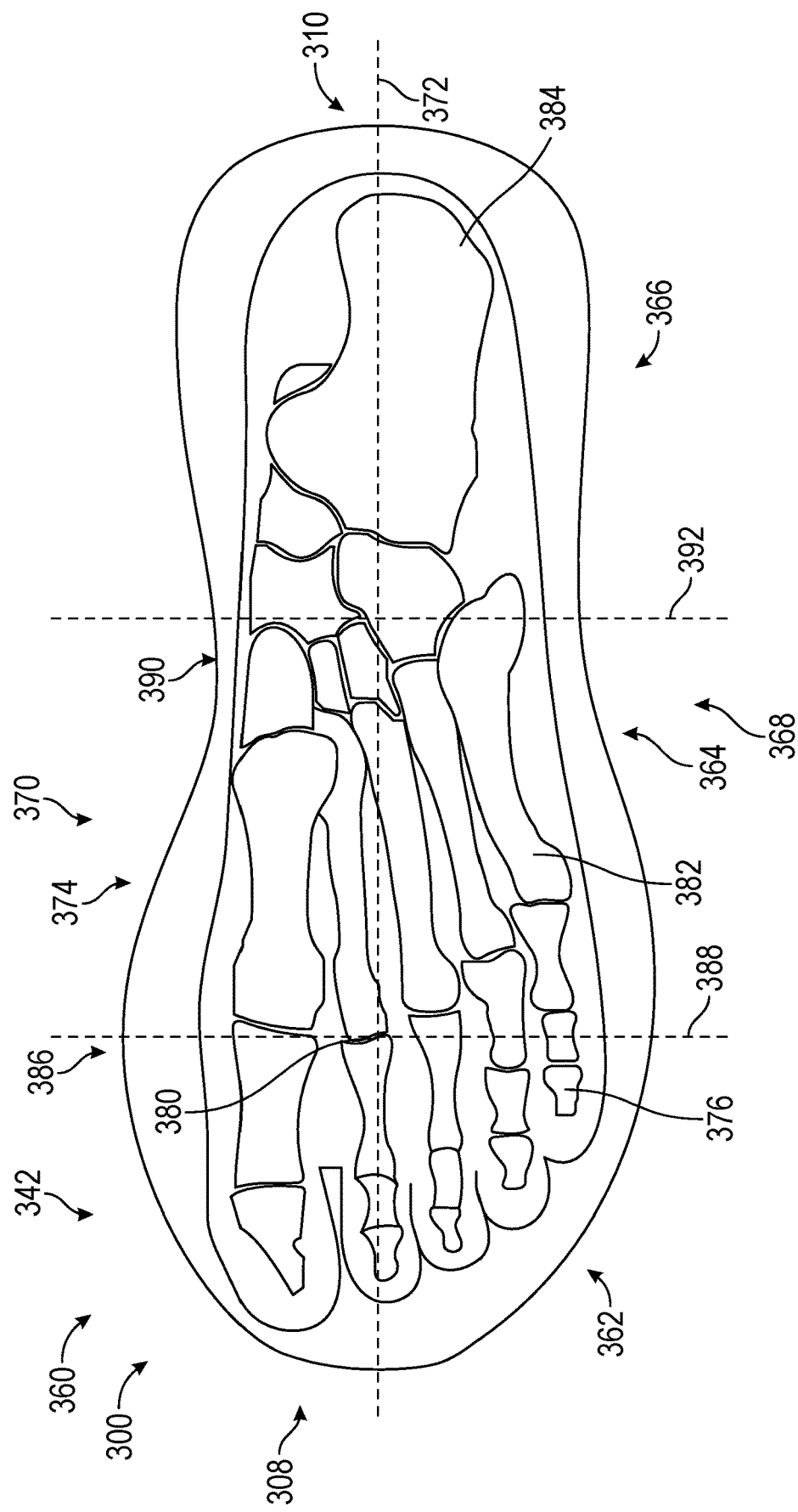
FIG. 10 is a top plan view of the article of footwear of FIG. 7, with an upper removed and a user's skeletal foot structure overlaid on the article of footwear.
Figure 11:
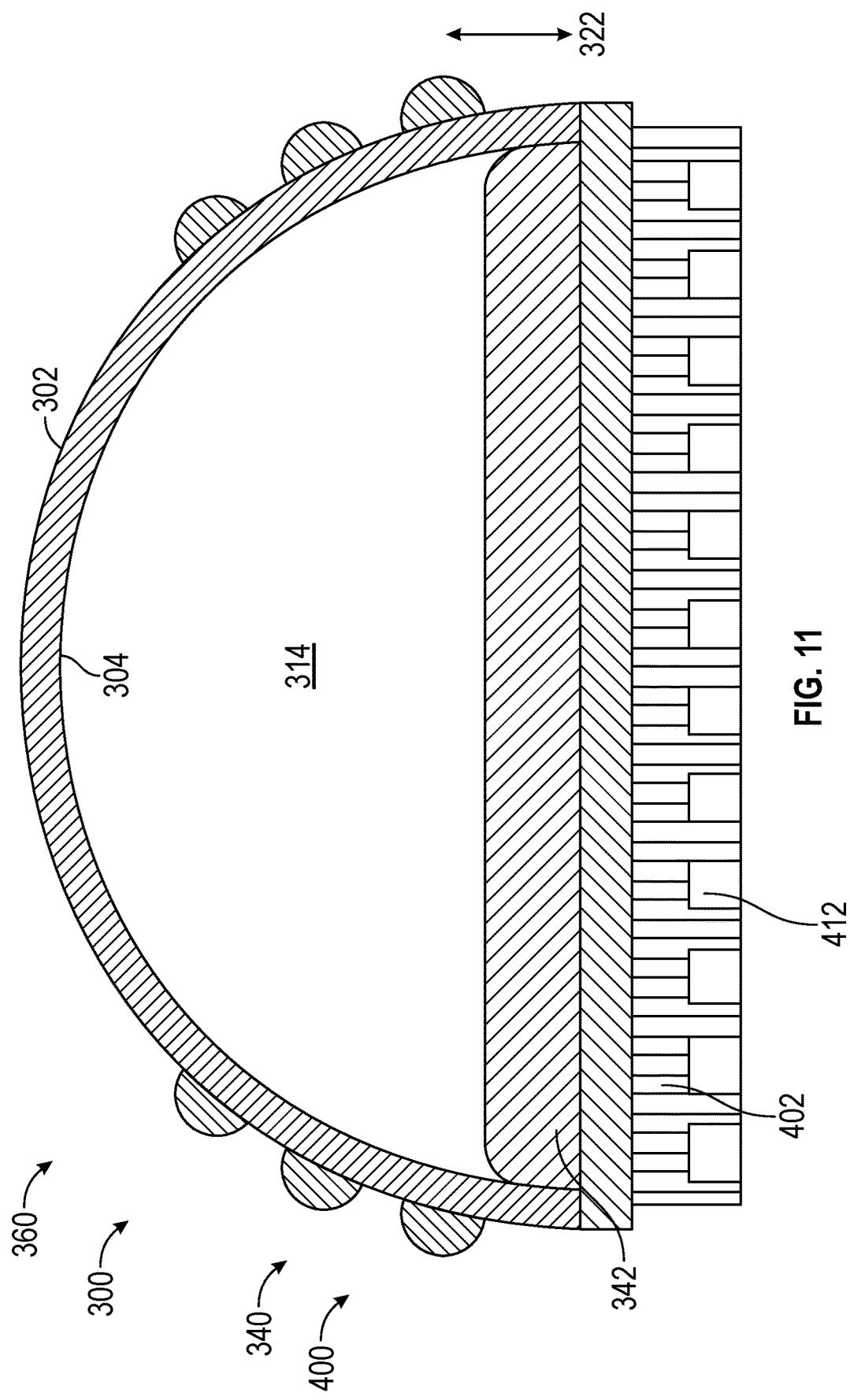
FIG. 11 is a cross-sectional view of the article of footwear of FIG. 9 taken along line 11-11.

For reference, the article of footwear 360 defines a forefoot region 362, a midfoot region 364, and a heel region 366 (see, e.g., FIG. 10). The forefoot region 362 generally corresponds with portions of the article of footwear 360 that encase portions of a foot that include the toes, the ball of the foot, and joints connecting the metatarsals with the toes or phalanges. The midfoot region 364 is proximate and adjoining the forefoot region 362, and generally corresponds with portions of the article of footwear 360 that encase the arch of a foot, along with the bridge of a foot. The heel region 366 is proximate and adjoining the midfoot region 364 and generally corresponds with portions of the article of footwear 360 that encase rear portions of the foot, including the heel or calcaneus bone, the ankle, and/or the Achilles tendon.

The article of footwear 360 defines a lateral side 368 (generally corresponding with the external lateral side 315 of the upper 300) and a medial side 370 (generally corresponding with the external medial side 312 of the upper 300). When a user is wearing the shoes, the lateral side 368 corresponds with an outside-facing portion of the article of footwear 360, while the medial side 370 corresponds with an inside-facing portion of the article of footwear 360. As such, a left shoe and a right shoe have opposing lateral sides and medial sides, such that the medial sides are closest to one another when a user is wearing the shoes, while the lateral sides are defined as the sides that are farthest from one another while the shoes are being worn.

The medial side 370 and the lateral side 368 adjoin one another along a longitudinal central plane or axis 372 of the article of footwear 360 (see, e.g., FIG. 10). The longitudinal central plane or axis 372 may demarcate a central, intermediate axis between the medial side 370 and the lateral side 368 of the article of footwear 360. Put differently, the longitudinal plane or axis 372 may extend between the rear distal end 310 and the front distal end 308 of the article of footwear 360 and may continuously define a middle of the midsole 342, the framework 340, and/or the upper 300 of the article of footwear 360 (e.g., the longitudinal plane or axis 372 is a straight axis extending through the rear distal end 310 of the heel region 366 to the front distal end 308 of the forefoot region 362).

The forefoot region 362 may generally correspond with portions of the article of footwear 360 that encase portions of a foot 374 that include the toes or phalanges 376, the ball of the foot 374, and one or more of the joints 380 that connect the metatarsals 382 of the foot 374 with the toes or phalanges 376 (see, e.g., FIG. 5). The midfoot region 364 is proximate and adjoins the forefoot region 362. The midfoot region 364 generally corresponds with portions of the article of footwear 360 that encase an arch of the foot 374, along with a bridge of the foot 374. The heel region 366 is proximate to the midfoot region 364 and adjoins the midfoot region 364. The heel region 366 generally corresponds with portions of the article of footwear 360 that encase rear portions of the foot 374, including the heel or calcaneus bone 384, the ankle (not shown), and/or the Achilles tendon (not shown).

The forefoot region 362, the midfoot region 364, the heel region 366 the medial side 370, and the lateral side 368 are intended to define boundaries or areas of the article of footwear 360. To that end, the forefoot region 362, the midfoot region 364, the heel region 366 the medial side 370, and the lateral side 368 generally characterize sections of the article of footwear 360. Certain aspects of the disclosure may refer to portions or elements that are coextensive with one or more of the forefoot region 362, the midfoot region 364, and the heel region 366 the medial side 370, and the lateral side 368. Further, both the upper 300, the midsole 342, and/or the framework 340 may be characterized as having portions within the forefoot region 362, the midfoot region 364, the heel region 366 the medial side 370, and/or the lateral side 368. Therefore, the upper 300, the midsole 342, and/or the framework 340 or components of the upper 300, the midsole 342 and/or the framework 340, may include portions thereof that are disposed within the forefoot region 362, the midfoot region 364, the heel region 366 the medial side 370, and/or the lateral side 368.

In some embodiments, the forefoot region 362 extends from the front distal end 308 to a widest portion 386 of the article of footwear 360. The widest portion 386 is defined or measured along a first line 388 that is perpendicular with respect to the longitudinal axis 372 that extends from the front distal end 308 to the rear distal end 310, which is opposite the front distal end 308. The midfoot region 364 extends from the widest portion 386 to a thinnest portion 390 of the article of footwear 300. The thinnest portion 390 of the article of footwear 360 is defined as the thinnest portion of the article of footwear 360 measured across a second line 392 that is perpendicular with respect to the longitudinal axis 372. The heel region 366 extends from the thinnest portion 390 to the rear distal end 310 of the article of footwear 360.

The medial side 370 begins at the front distal end 308 and bows outward along an inner side of the article of footwear 360 along the forefoot region 362 toward the midfoot region 364. The medial side 370 reaches the first line 388, at which point the medial side 370 bows inward, toward the central, longitudinal axis 372. The medial side 370 extends from the first line 388, i.e., the widest portion 386, toward the second line 392, i.e., the thinnest portion 390, at which point the medial side 370 enters into the midfoot region 364, i.e., upon crossing the first line 388. Once reaching the second line 392, the medial side 370 bows outward, away from the longitudinal, central axis 372, at which point the medial side 370 extends into the heel region 366, i.e., upon crossing the second line 392. The medial side 370 then bows outward and then inward toward the rear distal end 310, and terminates at a point where the medial side 370 meets the longitudinal, center axis 372.

The lateral side 368 begins at the front distal end 308 and bows outward along an outer side of the article of footwear 360 along the forefoot region 362 toward the midfoot region 364. The lateral side 368 reaches the first line 388, at which point the lateral side 368 bows inward, toward the longitudinal, central axis 372. The lateral side 368 extends from the first line 388, i.e., the widest portion 386, toward the second line 392, i.e., the thinnest portion 390, at which point the lateral side 368 enters into the midfoot region 364, i.e., upon crossing the first line 388. Once reaching the second line 392, the lateral side 368 bows outward, away from the longitudinal, central axis 372, at which point the lateral side 368 extends into the heel region 366, i.e., upon crossing the second line 392. The lateral side 368 then bows outward and then inward toward the rear distal end 310, and terminates at a point where the lateral side 368 meets the longitudinal, center axis 372.

It should be understood that numerous modifications may be apparent to those skilled in the art in view of the foregoing description, and individual components thereof, may be incorporated into numerous articles of footwear. Accordingly, aspects of the article of footwear 360 and components thereof, may be described with reference to general areas or portions of the article of footwear 360, with an understanding the boundaries of the forefoot region 362, the midfoot region 364, the heel region 366, the medial side 370, and/or the lateral side 368 as described herein may vary between articles of footwear.

However, aspects of the article of footwear 360 and individual components thereof, may also be described with reference to exact areas or portions of the article of footwear 360 and the scope of the appended claims herein may incorporate the limitations associated with these boundaries of the forefoot region 362, the midfoot region 364, the heel region 366, the medial side 370, and/or the lateral side 368 discussed herein.

In the illustrated embodiment, the upper 300 extends along the lateral side 368 and the medial side 370, and across the forefoot region 362, the midfoot region 364, and the heel region 366 to house and enclose the midsole 342 and a foot of a user. In some embodiments, the upper 300 may also include an instep area 394 (see FIGS. 7 and 8) that extends from the opening 306 in the heel region 366 over an area corresponding to an instep of a foot to an area adjacent the forefoot region 362. The instep area 394 may comprise an area similar to where a tongue is disposed. In the illustrated embodiment, the upper 300 does not include a tongue, i.e., the upper 300 is tongueless.

A lace 396 may be threaded through the plurality of eyelets 397, through the framework 340, and/or through the upper portion 316 of the upper 300 itself. The lace 396 may be manipulated by a user to allow the user to modify dimensions of the upper 300, e.g., to tighten or loosen portions of the upper 300, around a foot as desired by the user. In some embodiments, the article of footwear 360 may not be provided with a manually-operated lace 396, and may instead include an automatic lacing system that is electronically operated. In some embodiments, as described herein, the upper 300 may be manufactured to be smaller than a production-intent size and shape, which enables the article of footwear 360 to automatically tighten around a user's foot, upon the user inserting a foot into the upper 300. In these embodiments, the framework 340 may be fabricated from a stretchable material. In some embodiments, the upper 300 may include a variable connection (e.g., a rubber band, lacing, disc lacing, or an equivalent) that connects an upper area of the lateral side 368 to an upper area of the medial side 370, which ensures that the upper 300 may be arranged as close as possible to a wearer's metatarsus.

In some embodiments, selective segments, portions, or regions of the framework 340 may be movable relative to the upper 300 to enable a user to thread a lace through various portions of the framework 340. For example, in some embodiments, selective segments of the framework 340 may be printed into the upper 300 over regions of release agent (e.g., release paper, release spray or coating, etc.) to enable the selective segments of the framework 340 to be picked up or moved relative to the upper 300 to enable a lace to be threaded under and through the selective segments of the framework 340. In the illustrated embodiment of FIGS. 7 and 8, the lace 396 is threaded under the framework in two or more places along the framework 340.

With continued reference to FIGS. 7-11, in the illustrated embodiment, the framework 340 is printed, layer by layer, onto the external surface 302 of the upper 300. In the illustrated embodiment, the framework 340 includes a plurality of segments 400 and an outsole 402. In some embodiments, the plurality of segments 400 and the outsole 402 may be fabricated from the same material (e.g., a plastic material, a resin material, a polymer material, a wax material, or an equivalent). In some embodiments, the plurality of segments 400 and the outsole 402 may be fabricated from different materials, for example, the plurality of segments 400 may be fabricated from a first material and the outsole 402 may be fabricated from a second material.

In some embodiments, the framework 340 may be printed layer by layer onto the external surface 302 by an additive manufacturing system (e.g., a 3D printer). The various methods of additive manufacturing used to manufacture the framework 340 on a portion of the upper 300 according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photo-polymerization, sheet lamination, or electron beam freeform fabrication (EBF3).

In general, the framework 340 may be printed onto selective portions of the external surface 302 of the upper 300 to reinforce and stabilize the upper 300. In some embodiments, the framework 340 may be symmetrical about the longitudinal axis 372. In some embodiments, the framework 340 may define a different shape, pattern, and/or footprint on the lateral side 368 when compared to the medial side 370. In some embodiments, the framework 340 may define a matrix pattern that includes the plurality of segments 400. In the illustrated embodiment, the plurality of segments 400 extend along the external surface 302 of the upper 300 between the front distal end 308 and the rear distal end 310. For example, the plurality of segments 400 may extend in the heel-toe direction 320 through the forefoot region 362, the midfoot region 364, and the heel region 366. In the illustrated embodiment, the plurality of segments 400 are arranged on both the medial side 370 and the lateral side 368.

In the illustrated embodiment, the plurality of segments 400 extend upwardly in the sole-instep direction 322 from the bottom portion 326 or the sole side 323. In some embodiments, the plurality of segments 400 may extend upwardly in the sole-instep direction 322 from the bottom portion 326 to a location between the bottom portion 326 and an uppermost portion along the external surface 302 (e.g., a point or line along the external surface 302 that is arranged at a maximum distance the bottom portion 326). In the illustrated embodiment, the plurality of segments 400 extend upwardly in the sole-instep direction 322 from the bottom portion 326 to a location between the bottom portion 326 and the uppermost portion along the external surface 302 in the forefoot region 362 and the heel region 366. The plurality of segments 400 extend upwardly in the sole-instep direction 322 from the bottom portion 326 to the uppermost portion along the external surface 302 in a portion of the midfoot region 364. In other words, the plurality of segments 400 extend completely around the external surface 302 from the medial side 370 to the lateral side 368. In this way, for example, the plurality of segments 400 provide reinforcement and stability to the upper 300, while still allowing flexibility as a wearer is walking or running.

In the illustrated embodiments, the plurality of segments 400 include row segments or a first set of lines 404 and column segments or a second set of lines 406. In general, the row segments 404 extend along the external surface 302 in a first direction and the column segments 406 extend along the external surface 302 in a second direction that transverse to the first direction. For example, the column segments 406 may extend in a general direction that intersects the row segments 404, so that the row segments 404 interconnect with and intersect the column segments 406 to form a crisscross pattern.

In general, the row segments 404 may be arranged along the portions of the external surface 302 so that the row segments 404 are generally parallel to one another, and the column segments 406 may be arranged along portions of the external surface 302 so that the column segments 406 are generally parallel to one another. The generally parallel arrangement of the row segments 404 and the column segments 406 does not limit the shape of the row segments 404 and the column segments 406 to straight segments. For example, in the illustrated embodiment, the row segments 404 and the column segments 406 curved segments.

In general, the row segments 404 may be spaced from one another and the column segments 406 may be spaced from one another. In some embodiments, a row spacing 408 defined between adjacent pairs of the row segments 404 may be approximately equal. In the illustrated embodiment, the row spacing 408 defined between adjacent pairs of the row segments 404 varies from a row spacing minimum to a row spacing maximum. In some embodiments, a ratio between the row spacing maximum and the row spacing minimum may be between about 1 and about 5, or between about 1 and about 4, or between about 1 and about 3, or between about 2 and about 4. In general, varying the row spacing 408 may vary the amount of reinforcement and/or stability provided to the upper 300 in on the portions of the external surface 302. The ratios between the row spacing maximum and the row spacing minimum may maintain a critical balance between increased and/or decreased stability/reinforcement while maintaining a pleasing aesthetic for the article of footwear 360. In some embodiments, the row spacing 408 defined between the individual row segments 404 in an adjacent pair of row segments 404 may vary in addition to or as an alternative of the row spacing 408 varying between adjacent pairs of the row segments 404.

In some embodiments, a column spacing 410 defined between adjacent pairs of the column segments 406 may be approximately equal. In the illustrated embodiment, the column spacing 410 defined between adjacent pairs of the column segments 406 varies from a column spacing minimum to a column spacing maximum. In some embodiments, a ratio between the column spacing maximum and the column spacing minimum may be between about 1 and about 5, or between about 1 and about 4, or between about 1 and about 3, or between about 2 and about 4. In general, varying the column spacing 410 may vary the amount of reinforcement and/or stability provided to the upper 300 in on the portions of the external surface 302. The ratios between the column spacing maximum and the column spacing minimum may maintain a critical balance between increased and/or decreased stability/reinforcement while maintaining a pleasing aesthetic for the article of footwear 360. In some embodiments, the column spacing 410 defined between the individual column segments 406 in an adjacent pair of column segments 406 may vary in addition to or as an alternative of the column spacing 410 varying between adjacent pairs of the column segments 406.

In general, each of the plurality of segments 400 defines a shape and size. In some embodiments, the shape and size of each of the plurality of segments 400 may remain about constant over the framework 340. For example, the plurality of segments 400 each may define a segment height and a segment width. In some embodiments, the segment heights and the segment widths may be about equal.

In some embodiments, the segment heights (e.g., a maximum height defined by a segment in a direction normal to the external surface 302), the segment widths (e.g., a maximum width defined in a direction parallel to the external surface 302), and/or the segment shapes may vary over selective portions of the external surface 302 to provide increased or decreased stability/reinforcement to the upper 300. Alternatively or additionally, a shape of the plurality of segments 400 may vary (e.g., transition from triangular or frustoconical in cross-section to round or semicircular in cross-section) to provide increased stability/reinforcement.

For example, the segment height and/or the segment width may be increased in portions of the external surface 302 to provide increased stability/reinforcement. For example, the segment height and/or the segment width may be increased in the heel region 366 relative to the midfoot region 364 and/or the forefoot region 362 to provide increased stability in the heel region 366 where the upper 300 experiences less flexing during walking or running. In some embodiments, the segment height and/or the segment width may increase adjacent to the bottom portion 326. For example, the segment height and/or the segment width may increase as the plurality of segments 400 extend in the sole-instep direction 322 toward the bottom portion 326.

In some embodiments, the segment heights may vary from a minimum segment height to a maximum segment height. For example, the maximum segment height between about 1 and about 5 times larger than the minimum segment height, or between about 1 and about 4 times larger than the minimum segment height, or between about 1 and about 3 times larger than the minimum segment height, or between about 2 and about 4 times larger than the minimum segment height. The ranges between the maximum segment height and the minimum segment height described herein maintain a critical balance between increased and/or decreased stability/reinforcement while maintaining a pleasing aesthetic for the article of footwear.

In some embodiments, the segment widths may vary from a minimum segment widths to a maximum segment widths. For example, the maximum segment widths between about 1 and about 5 times larger than the minimum segment widths, or between about 1 and about 4 times larger than the minimum segment widths, or between about 1 and about 3 times larger than the minimum segment widths, or between about 2 and about 4 times larger than the minimum segment widths. The ranges between the maximum segment widths and the minimum segment widths described herein maintain a critical balance between increased and/or decreased stability/reinforcement while maintaining a pleasing aesthetic for the article of footwear.

The outsole 402 is printed, layer by layer, onto the bottom portion 326 of the external surface 302 (see, e.g., FIG. 9). In the illustrated embodiment, a portion of the plurality of segments 400 (e.g., at least one segment in the forefoot region 362, the midfoot region 364, or the heel region 366) extends from the lateral side 368 and the medial side 370 to at least partially extend over the bottom portion 326 and connect to the outsole 402. The outsole 402 may cover a region of the bottom portion 326. In the illustrated embodiment, the outsole 402 includes a plurality of outsole recesses 412 that are recessed into the outsole 402 (see, e.g., FIG. 11). The outsole recesses 412 may be at least partially recessed into the outsole 402 and may extend laterally between opposing sides of the outsole 402. The outsole recesses 412 may be spaced from one another in the heel-toe direction 320 and may be arranged along the outsole 402 in the heel-toe direction 320.

In some embodiments, the framework 340 as a whole may be printed layer by layer at onto the external surface 302. For example, one layer of the entire framework 340 (e.g., the outsole 402 and the plurality of segments 400) may be printed at a time until all of the layers of the framework 340 have been printed onto the portions of the external surface 302. In some embodiments, portions of the framework 340 may be printed layer by layer prior to other portions of the framework 340 being printed layer by layer. For example, the outsole 402 may be printed layer by layer and then the plurality of segments 400 may be printed layer by layer, or vice versa.

Figure 12:
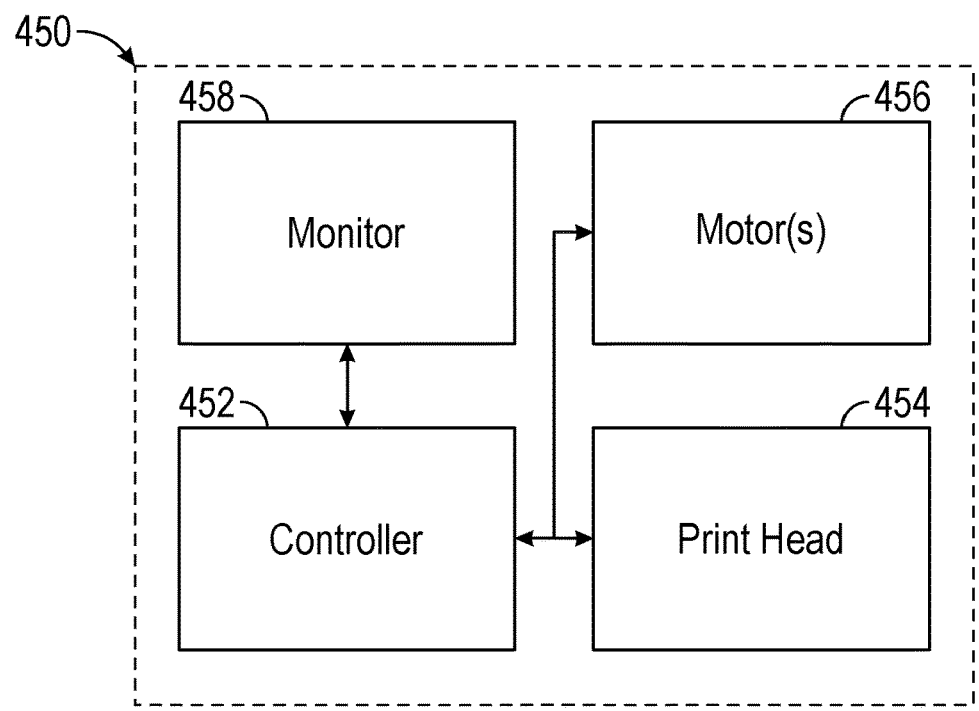
FIG. 12 is a block diagram of an additive manufacturing system.

As described herein, a framework may be printed layer by layer on the upper onto an upper by an additive manufacturing system (e.g., a 3D printer). FIG. 12 illustrates one embodiment of an additive manufacturing system 450 that may be used to design and print a framework and/or a midsole according to the present disclosure. The additive manufacturing system 450 may include a controller 452, a print head 454, one or more motors 456, and a monitor or display 458. The controller 452 may include a processor with memory that includes instructions, which are carried out by the processor. The controller 452 may be in communication with the print head 454, the one or more motors 456, and the monitor 458. The controller 452 may be configured to instruct the print head 454 to deposit material layer by layer in a predetermined pattern in a particular location. In some embodiments, the controller 452 may be separate from but in communication with the print head 454.

Figure 13:
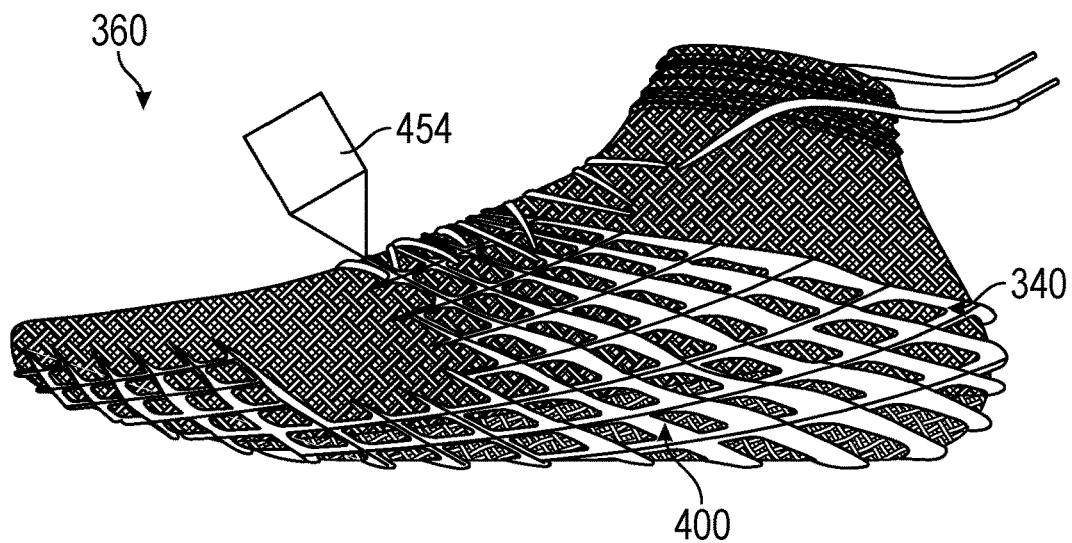
FIG. 13 is a lateral side view of the article of footwear of FIG. 7, with a print heat printing a framework on the upper or sleeve.

In some embodiments, the controller 452 may be configured to design or receive a file that includes a midsole or a framework. For example, the controller 452 may in communication with the monitor 458 to allow a user to visualize and design a midsole or a framework. In some embodiments, the print head 454 may be coupled to the one or more motors 456 and the print head 454 may be configured to travel around all sides and axis defined by the article of footwear 360 to print the framework 340 onto the portions of the external surface 302 (see, e.g., FIG. 13).

Figure 14:
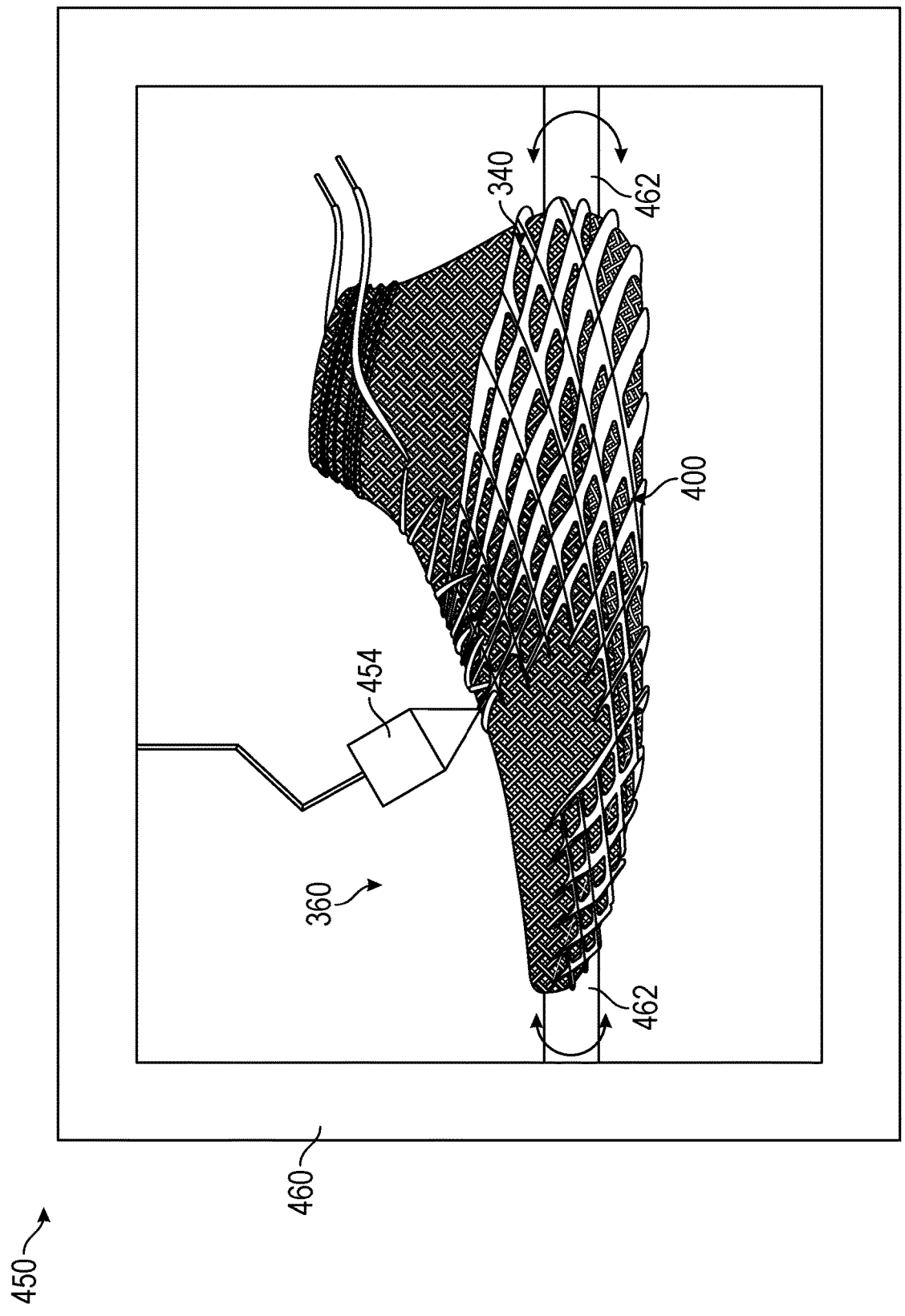
FIG. 14 is a schematic illustration of the article of footwear of FIG. 7 arranged within an additive manufacturing system.

In some embodiments, the print head 454 may be enclosed within a housing 460 that supports the article of footwear 360 with posts 462. The posts 462 may be coupled to the one or more motors 456, which allows the article of footwear 360 to be rotated as the framework 340 is printed on to the external surface 302 (see, e.g., FIG. 14).

Figure 15:
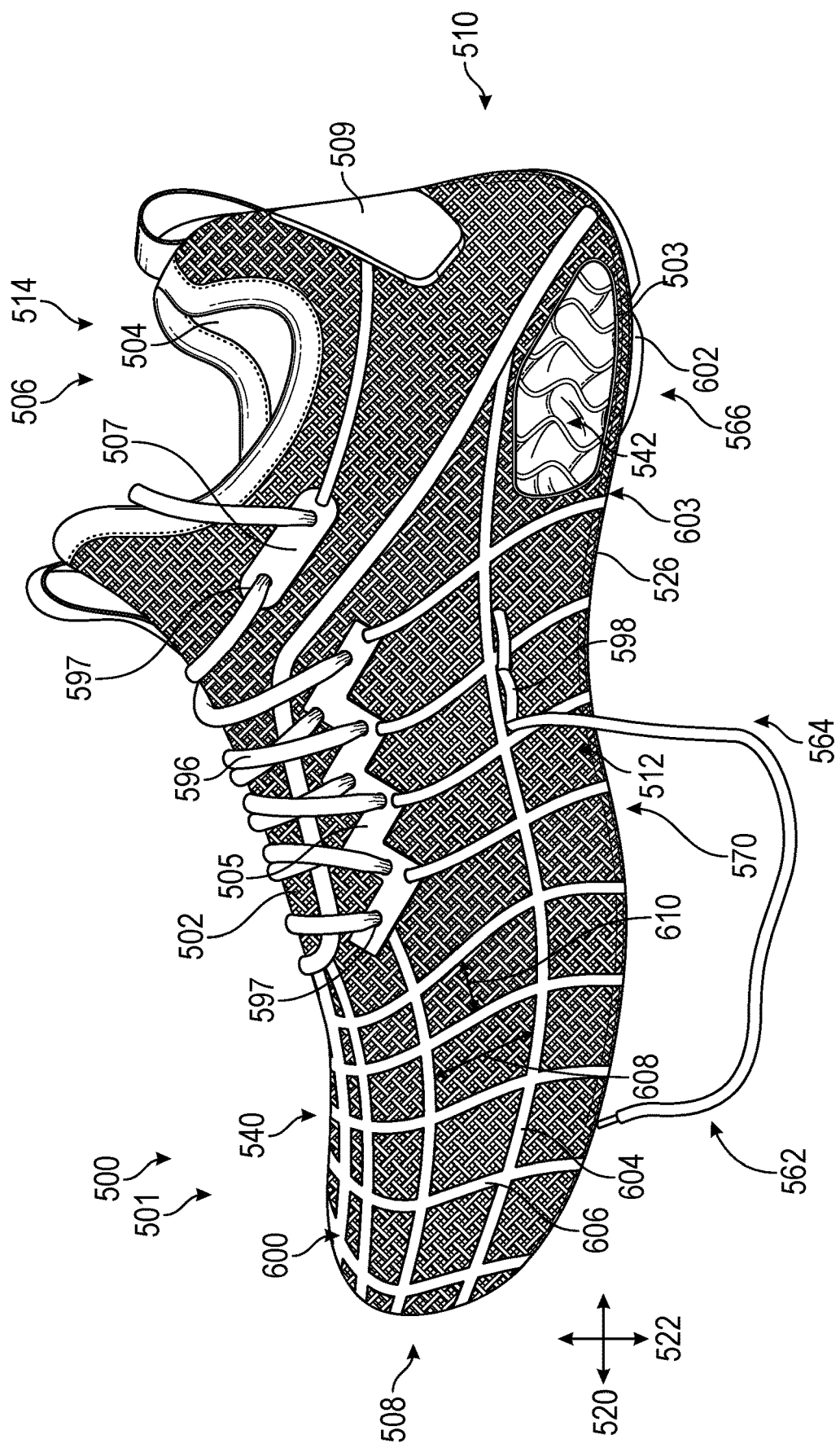
FIG. 15 is a medial side view of an article of footwear including an upper or sleeve with an aperture.
Figure 16:
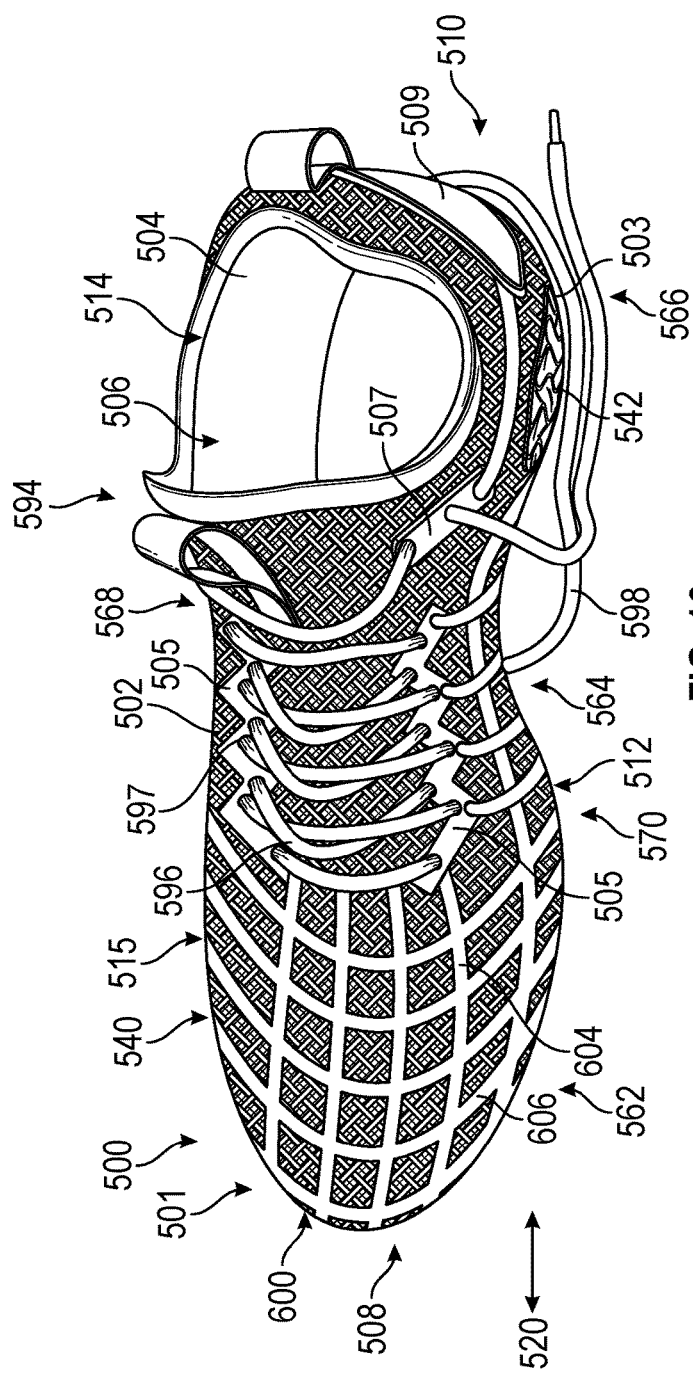
FIG. 16 is a top perspective view of the article of footwear of FIG. 15.
Figure 17:
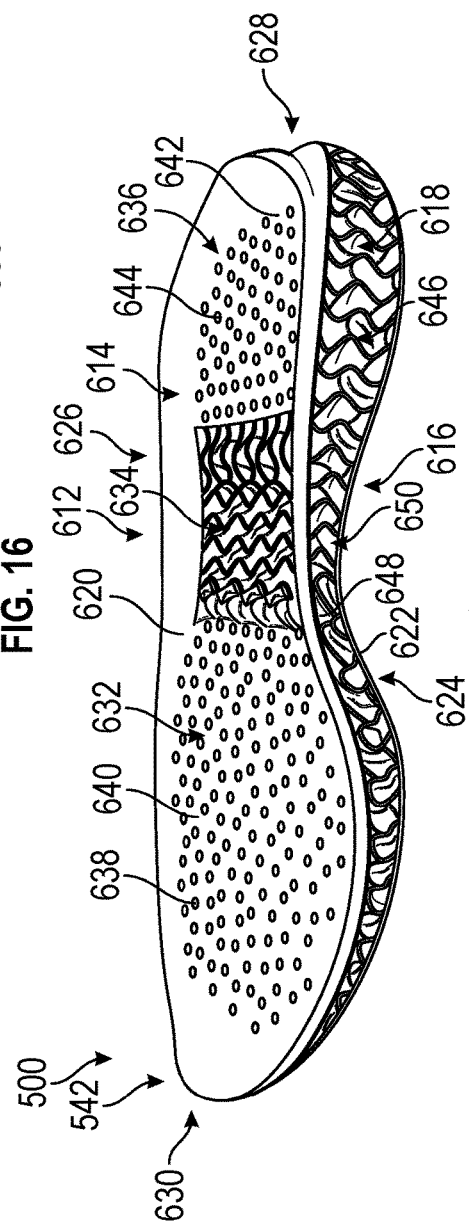
FIG. 17 is a top perspective view of a midsole of the article of footwear of FIG. 15.
Figure 18:
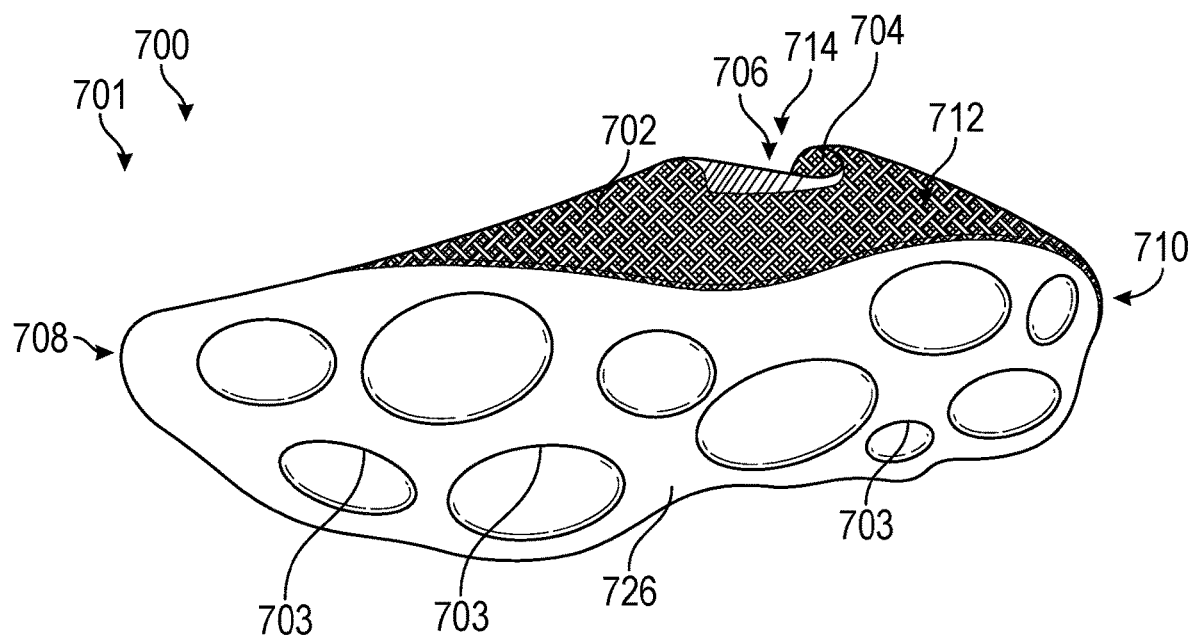
FIG. 18 is a bottom perspective view of an upper or sleeve with a plurality of apertures.
Figure 19:
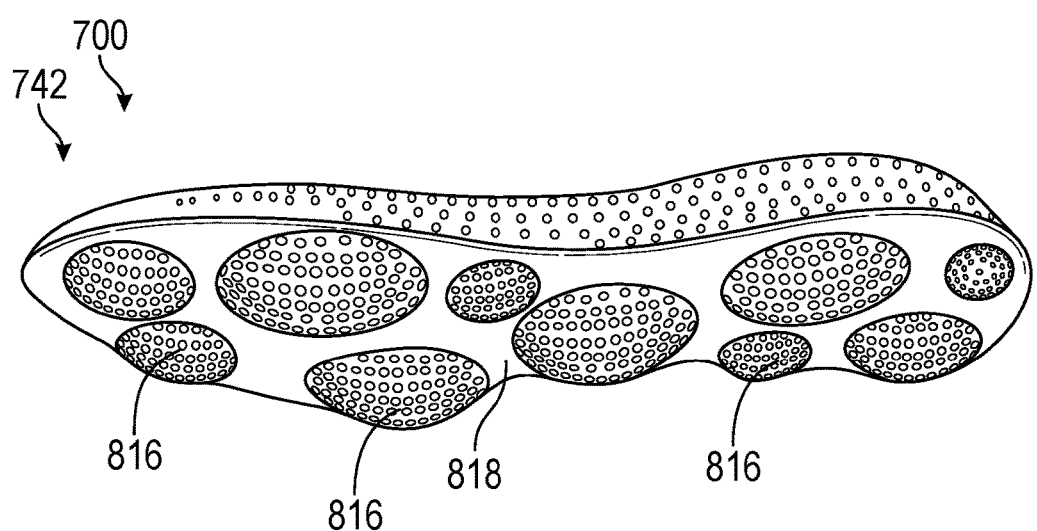
FIG. 19 is a bottom perspective view of a midsole with a plurality of protrusions.

The customization and design freedoms provided by the manufacture of the upper and the use of an additive manufacturing system to print the framework allow various design possibilities for an article of footwear. For example, FIGS. 15-17 illustrate an embodiment of an article of footwear 500 that may be formed, for example, by the method 100 or the method 200. In the illustrated embodiment, the article of footwear 500 includes an upper 501 having an external surface 502, an internal surface 504, a first lace support 505, an opening 506, and a second lace support 507 disposed proximate the opening 506. The upper 501 defines a front distal end 508, a rear distal end 510, an external medial side 512, and an external lateral side 515. In general, the external surface 502 may extend over the exterior of the upper 501, and the internal surface 504 may form an internal cavity 514 within which a foot of a user may be received. The opening 506 may provides access to the internal cavity 514.

In the illustrated embodiment, the upper 501 may be fabricated from a single knit material. In general, the specific properties that a particular type of yarn or knit material will impart to an area of a knitted component may at least partially depend upon the materials that form the various filaments and fibers of the yarn. For example, cotton may provide a soft effect, biodegradability, or a natural aesthetic to a knit material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component or material may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn or knit material and other aspects of the yarn or knit material may be selected to impart a variety of properties to particular areas of the upper 501.

In some embodiments, an elasticity of a knit material or structure fabricated from a knit material may be measured based on comparing a width or length of the knit structure in a first, non-stretched state to a width or length of the knit structure in a second, stretched state after the knit structure has a force applied to the knit structure in a lateral direction. As will be described herein, the upper 501 may also include additional structural elements to reinforce and/or stabilize selective portions of the upper 501. In some embodiments, the properties associated with the upper 501, e.g., a stitch type, a yarn type, or characteristics associated with different stitch types or yarn types, such as elasticity, aesthetic appearance, thickness, air permeability, transparency, or scuff-resistance, may be varied.

In general, the description herein relating to the forefoot region 362, the midfoot region 364, the heel region 366, the lateral side 368, the medial side 370, and the longitudinal axis 372 of the article of footwear 360 applies accordingly to the article of footwear 500, with the similar features identified using like reference numerals indexed in the 500's. In addition, the diagram and description associated with FIG. 10 may apply correspondingly to the article of footwear 500.

In the illustrated embodiment, the upper 501 extends along the lateral side 568 (see FIG. 16) and the medial side 570, and across the forefoot region 562, the midfoot region 564, and the heel region 566 to house and enclose the midsole 542 and a foot of a user. In some embodiments, the upper 501 may also include an instep area 594 that extends from the opening 506 in the heel region 566 over an area corresponding to an instep of a foot to an area adjacent the forefoot region 562. The instep area 594 may comprise an area similar to where a tongue is disposed. In the illustrated embodiment, the upper 501 does not include a tongue, i.e., the upper 501 is tongueless.

In the illustrated embodiment, the upper 501 includes a cutout, window, or aperture 503 formed in the medial side 570 of the upper adjacent to a bottom portion 526 of the upper 501 in the heel region 566. In some embodiments, another aperture may be symmetrically (e.g., about the longitudinal axis) formed in the lateral side 568. With the midsole 342 arranged within the internal cavity 514, at least a portion of the midsole 542 may be visible through the aperture 503. To that end, such portion of the midsole 542 protrudes through the aperture 503 formed in the upper 501.

A lace 596 may be threaded through a plurality of eyelets 597 formed on the first lace support 505 and the second lace support 507. In some embodiments, the eyelets 597 may be formed by selective segments of the framework 540 that are movable relative to the upper 501, rather than the first lace support 505 and/or the second lace support 507. In the illustrated embodiment of FIG. 16, the second lace support 507 is at least partially disposed between the first lace support 505 and the opening 506, although other configurations are possible. The lace 596 may be manipulated by a user to allow the user to modify dimensions of the upper 501, e.g., to tighten or loosen portions of the upper 501, around a foot as desired by the user. In the illustrated embodiment, arch-joint lacing 598 is included on the upper 501 to provide three-hundred and sixty degree lacing.

In the illustrated embodiment, the upper 501 includes a framework 540 printed layer by layer onto the external surface 502 by an additive manufacturing system (e.g., a 3D printer). The framework 540 includes a plurality of segments 600 and an outsole 602. In some embodiments, the plurality of segments 600 and the outsole 602 may be fabricated from the same material (e.g., a plastic material, a resin material, a polymer material, a wax material, or an equivalent). In some embodiments, the plurality of segments 600 and the outsole 602 may be fabricated from different materials, for example, the plurality of segments 600 may be fabricated from a first material and the outsole 602 may be fabricated from a second material.

The various methods of additive manufacturing used to manufacture the framework 540 on a portion of the upper 501 according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photo-polymerization, sheet lamination, or electron beam freeform fabrication (EBF3).

In general, the framework 540 may be printed onto selective portions of the external surface 502 of the upper 501 to reinforce and stabilize the upper 501. In some embodiments, the framework 540 may be symmetrical about the longitudinal axis defined by the article of footwear 500. In some embodiments, the framework 540 may define a different shape, pattern, and/or footprint on the lateral side 568 when compared to the medial side 570. In some embodiments, the framework 540 may define a matrix pattern that includes the plurality of segments 600. In the illustrated embodiment, the plurality of segments 600 extend along the external surface 502 of the upper 501 between the front distal end 508 and the rear distal end 510. For example, the plurality of segments 600 may extend in a heel-toe direction 520 through the forefoot region 562, the midfoot region 564, and at least partially into the heel region 566. In the illustrated embodiment, the plurality of segments 600 are arranged on both the medial side 570 and the lateral side 568.

In the illustrated embodiment, the plurality of segments 600 extend upwardly in the sole-instep direction 522 from the bottom portion 526 or a sole side 603 (see FIG. 15). In some embodiments, the plurality of segments 600 may extend upwardly in the sole-instep direction 522 from the bottom portion 526 to a location between the bottom portion 526 and an uppermost portion along the external surface 502 (e.g., a point or line along the external surface 502 that is arranged at a maximum distance the bottom portion 526). In the illustrated embodiment, the plurality of segments 600 extend upwardly in the sole-instep direction 522 from the bottom portion 526 to a location between the bottom portion 526 and the uppermost portion along the external surface 502 in the midfoot region 564. The plurality of segments 600 extend upwardly in the sole-instep direction 522 from the bottom portion 526 to the uppermost portion along the external surface 502 in a portion of the forefoot region 562. In other words, the plurality of segments 600 extend completely around the external surface 502 from the medial side 570 to the lateral side 568 in at least a portion of the forefoot region 562. In this way, for example, the plurality of segments 600 provide reinforcement and stability to the upper 501, while still allowing flexibility as a wearer is walking or running.

In the illustrated embodiments, the plurality of segments 600 include row segments or a first set of lines 604 and column segments or a second set of lines 606. In general, the row segments 604 extend along the external surface 502 in a first direction and the column segments 606 extend along the external surface 502 in a second direction that transverse to the first direction. For example, the column segments 606 may extend in a general direction that intersects the row segments 604, so that the row segments 604 interconnect with and intersect the column segments 606 to form a crisscross pattern. In other words, the plurality of segments 600 define a matrix pattern including the interconnected row segments 604 and column segments 606.

In general, the row segments 604 may be arranged along the portions of the external surface 502 so that the row segments 604 are generally parallel to one another, and the column segments 606 may be arranged along portions of the external surface 502 so that the column segments 606 are generally parallel to one another. The generally parallel arrangement of the row segments 604 and the column segments 606 does not limit the shape of the row segments 604 and the column segments 606 to straight segments. For example, in the illustrated embodiment, the row segments 604 and the column segments 606 are curved or wavy segments.

In general, the row segments 604 may be spaced from one another and the column segments 606 may be spaced from one another. In some embodiments, a row spacing 608 defined between adjacent pairs of the row segments 604 may be approximately equal. In the illustrated embodiment, the row spacing 608 defined between adjacent pairs of the row segments 604 varies from a row spacing minimum to a row spacing maximum. In some embodiments, a ratio between the row spacing maximum and the row spacing minimum may be between about 1 and about 5, or between about 1 and about 4, or between about 1 and about 3, or between about 2 and about 4. In general, varying the row spacing 608 may vary the amount of reinforcement and/or stability provided to the upper 501 in on the portions of the external surface 502. The ratios between the row spacing maximum and the row spacing minimum may maintain a critical balance between increased and/or decreased stability/reinforcement while maintaining a pleasing aesthetic for the article of footwear 500. In some embodiments, the row spacing 608 defined between the individual row segments 604 in an adjacent pair of row segments 604 may vary in addition to or as an alternative of the row spacing 608 varying between adjacent pairs of the row segments 604.

In some embodiments, a column spacing 610 defined between adjacent pairs of the column segments 606 may be approximately equal. In the illustrated embodiment, the column spacing 610 defined between adjacent pairs of the column segments 606 varies from a column spacing minimum to a column spacing maximum. In some embodiments, a ratio between the column spacing maximum and the column spacing minimum may be between about 1 and about 5, or between about 1 and about 4, or between about 1 and about 3, or between about 2 and about 4. In general, varying the column spacing 610 may vary the amount of reinforcement and/or stability provided to the upper 501 in on the portions of the external surface 502. The ratios between the column spacing maximum and the column spacing minimum may maintain a critical balance between increased and/or decreased stability/reinforcement while maintaining a pleasing aesthetic for the article of footwear 500. In some embodiments, the column spacing 610 defined between the individual column segments 606 in an adjacent pair of column segments 606 may vary in addition to or as an alternative of the column spacing 610 varying between adjacent pairs of the column segments 606.

In general, each of the plurality of segments 600 defines a shape and size. In some embodiments, the shape and size of each of the plurality of segments 600 may remain about constant over the framework 540. For example, the plurality of segments 600 each may define a segment height and a segment width. In some embodiments, the segment heights and the segment widths may be about equal.

In some embodiments, the segment heights (e.g., a maximum height defined by a segment in a direction normal to the external surface 502), the segment widths (e.g., a maximum width defined in a direction parallel to the external surface 502), and/or the segment shapes may vary over selective portions of the external surface 502 to provide increased or decreased stability/reinforcement to the upper 501. Alternatively or additionally, a shape of the plurality of segments 600 may vary (e.g., transition from triangular or frustoconical in cross-section to round or semicircular in cross-section) to provide increased stability/reinforcement.

For example, the segment height and/or the segment width may be increased in portions of the external surface 502 to provide increased stability/reinforcement. For example, the segment height and/or the segment width may be increased in the heel region 566 relative to the midfoot region 564 and/or the forefoot region 562 to provide increased stability in the heel region 566 where the upper 501 experiences less flexing during walking or running. In some embodiments, the segment height and/or the segment width may increase adjacent to the bottom portion 526. For example, the segment height and/or the segment width may increase as the plurality of segments 600 extend in the sole-instep direction 522 toward the bottom portion 526.

In some embodiments, the segment heights may vary from a minimum segment height to a maximum segment height. For example, the maximum segment height between about 1 and about 5 times larger than the minimum segment height, or between about 1 and about 4 times larger than the minimum segment height, or between about 1 and about 3 times larger than the minimum segment height, or between about 2 and about 4 times larger than the minimum segment height. The ranges between the maximum segment height and the minimum segment height described herein maintain a critical balance between increased and/or decreased stability/reinforcement while maintaining a pleasing aesthetic for the article of footwear.

In some embodiments, the segment widths may vary from a minimum segment widths to a maximum segment widths. For example, the maximum segment widths between about 1 and about 5 times larger than the minimum segment widths, or between about 1 and about 4 times larger than the minimum segment widths, or between about 1 and about 3 times larger than the minimum segment widths, or between about 2 and about 4 times larger than the minimum segment widths. The ranges between the maximum segment widths and the minimum segment widths described herein maintain a critical balance between increased and/or decreased stability/reinforcement while maintaining a pleasing aesthetic for the article of footwear.

In the illustrated embodiment, the article of footwear 500 includes additional structure that may supplement the framework 540 to reinforce and stabilize the upper 501. For example, the article of footwear 500 includes a first lace support plate 505 arranged on both the lateral side 568 and the medial side 570, a second lace support plate 507 arranged on both the lateral side 568 and the medial side 570, and a heel support plate 509. The first lace support plates 505 define a generally zig-zag pattern and extends along the upper through at least a portion of the midfoot region 564. The first lace supports 505 includes a portion of the plurality of eyelets 597 formed therein. The second support plates 507 are spaced from the first support plates 505 in the heel-toe direction 520, and the second support plates 507 may include a portion of the plurality of eyelets 597 formed therein. The second support plates 507 may be arranged within the midfoot region 564 and/or the heel region 566. The heel support plate 509 extends around at least a portion of the heel region 566 from the lateral side 568 to the medial side 570.

With specific reference to FIG. 17, the midsole 542 includes a body 612 that defines an upper side 614, a bottom side 616, and a lattice structure 618 extending throughout the body 612 and between an upper surface 620 and a bottom surface 622. The body 612 further defines a medial side 624, a lateral side 626, a rear distal end 628, and a front distal end 630. In the illustrated embodiment, the upper surface 620 defines a variable geometric structure that includes a first portion 632, a second portion 634, and a third portion 636. The second portion 634 is arranged between the first portion 632 and the third portion 636. The first portion 632 extends from the front distal end 630 to an intersection between the first portion 632 and the second portion 634. The third portion 636 extends from the rear distal end 628 to an intersection between the third portion and the second portion 634. In some embodiments, the first portion 632 may extend over a forefoot region and at least partially into a midfoot region defined by the body 612. In some embodiments, the second portion 634 may extend at least partially over the midfoot region and into a heel region defined by the body 612. In some embodiments, the third portion 636 may extend at least partially over the heel region defined by the body 612.

The first portion 632 and the third portion 636 define differing geometric structures than the second portion 634. For example, the first portion 632 may include a first support surface 640 having a first plurality of apertures 638 that extend at least partially through the first support surface 640. The plurality of apertures 638 are arranged in an array pattern over the first support surface 640. Similar to the first portion 632, the third portion 636 includes a second support surface 642 having a second plurality of apertures 644 that extend at least partially through the second support surface 642. The second plurality of apertures 644 are arranged in an array pattern over the second support surface 642. The second portion 634 defines a generally open structure that is formed by the lattice structure 618. In other words, the first support surface 640 that extends over the first portion 632 and the second support surface 642 that extends over the third portion 636 may not extend over the second portion 634, and the lattice structure 618 may be visible through the upper side 614 of the body 612 at the second portion 634.

In the illustrated embodiment, the lattice structure 618 includes a unit cell 646 that is formed by interconnected surfaces or segments 648 that define one or more openings voids, apertures, channels, tunnels, or passages 650 that extend through the body 612. In some embodiments, the interconnected surfaces 648 may define minimal surfaces. In some embodiments, the interconnected surfaces 648 may define triply periodic minimal surfaces (e.g., a gyroid). In general, the use of a differential geometry structure (e.g., a gyroid) may reduce stress concentration formed along the midsole 542 due to the reduction in sharp edges formed in the body 612, which provides improved cushioning performance in the midsole 542. In addition, the variable geometries defined along the upper side 614 provides added support in regions of high force/pressure along the midsole 542. For example, the first support surface 640 may provide additional support to the forefoot region (e.g., under the ball of a user's foot and/or under the toes of a user) and the second support surface 642 may provide additional support to the heel region (e.g., under a user's heel). The added support provided by the first support surface 640 and the second support surface 642 may aid in spreading out or distributing the pressure/force exerted thereon over the lattice structure 618 and further leverage the improved cushioning properties of the lattice structure 618.

FIGS. 18-21 illustrate an embodiment of an article of footwear 700 that may be formed, for example, by the method 100 or the method 200. In the illustrated embodiment, the article of footwear 700 includes an upper 701 having an external surface 702, an internal surface 704, and an opening 706. The upper 701 defines a front distal end 708, a rear distal end 710, an external medial side 712, and an external lateral side (not shown). In general, the external surface 702 may extend over the exterior of the upper 701, and the internal surface 704 may form an internal cavity 714 within which a foot of a user may be received. The opening 706 may provides access to the internal cavity 714.

In the illustrated embodiment, the upper 701 may be fabricated from a single knit material. In general, the specific properties that a particular type of yarn or knit material will impart to an area of a knitted component may at least partially depend upon the materials that form the various filaments and fibers of the yarn. For example, cotton may provide a soft effect, biodegradability, or a natural aesthetic to a knit material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component or material may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn or knit material and other aspects of the yarn or knit material may be selected to impart a variety of properties to particular areas of the upper 701.

In some embodiments, an elasticity of a knit material or structure fabricated from a knit material may be measured based on comparing a width or length of the knit structure in a first, non-stretched state to a width or length of the knit structure in a second, stretched state after the knit structure has a force applied to the knit structure in a lateral direction. As will be described herein, the upper 701 may also include additional structural elements to reinforce and/or stabilize selective portions of the upper 701. In some embodiments, the properties associated with the upper 701, e.g., a stitch type, a yarn type, or characteristics associated with different stitch types or yarn types, such as elasticity, aesthetic appearance, thickness, air permeability, transparency, or scuff-resistance, may be varied.

In general, the description herein relating to the forefoot region 362, the midfoot region 364, the heel region 366, the lateral side 368, the medial side 370, and the longitudinal axis 372 of the article of footwear 360 applies accordingly to the article of footwear 700, with the similar features identified using like reference numerals indexed in the 700's. In addition, the diagram and description associated with FIG. 10 may apply correspondingly to the article of footwear 700.

In the illustrated embodiment, the upper 701 extends along the lateral side 768 and the medial side 770, and across the forefoot region 762, the midfoot region 764, and the heel region 766 to house the midsole 742 and a foot of a user. In some embodiments, the upper 701 may also include an instep area 794 that extends from the opening 706 in the heel region 766 over an area corresponding to an instep of a foot to an area adjacent the forefoot region 762. The instep area 794 may comprise an area similar to where a tongue is disposed. In the illustrated embodiment, the upper 701 does not include a tongue, i.e., the upper 701 is tongueless.

In the illustrated embodiment, the upper 701 includes a plurality of cutouts, windows or apertures 703 formed in a bottom portion 726 of the upper 701 through which a portion of the midsole 742 may be externally visible. The plurality of apertures 703 each may extend through the bottom portion 726 of the upper 701 and may define varying sizes. The plurality of apertures 703 may be arranged in an array over the bottom portion 726 and may extend between the front distal end 708 and the rear distal end 710. In general, the apertures 703 may be sized and arranged to allow corresponding protrusions to extend therethrough.

A lace 796 may be threaded through the plurality of eyelets 797. In some embodiments, the eyelets 797 may be formed by portions of the framework 740 that are movable relative to the upper 701. The lace 796 may be manipulated by a user to allow the user to modify dimensions of the upper 701, e.g., to tighten or loosen portions of the upper 701, around a foot as desired by the user.

In the illustrated embodiment, the upper 701 includes a framework 740 printed layer by layer onto the external surface 702 by an additive manufacturing system (e.g., a 3D printer). The framework 740 includes a plurality of segments 800 and an outsole 802 (see, e.g., FIG. 20). In some embodiments, the plurality of segments 800 and the outsole 802 may be fabricated from the same material (e.g., a plastic material, a resin material, a polymer material, a wax material, or an equivalent). In some embodiments, the plurality of segments 800 and the outsole 802 may be fabricated from different materials, for example, the plurality of segments 800 may be fabricated from a first material and the outsole 802 may be fabricated from a second material.

The various methods of additive manufacturing used to manufacture the framework 740 on a portion of the upper 701 according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photo-polymerization, sheet lamination, or electron beam freeform fabrication (EBF3).

In general, the framework 740 may be printed onto selective portions of the external surface 702 of the upper 701 to reinforce and stabilize the upper 701. In some embodiments, the framework 740 may be symmetrical about the longitudinal axis defined by the article of footwear 700. In some embodiments, the framework 740 may define a different shape, pattern, and/or footprint on the lateral side 768 when compared to the medial side 770. In the illustrated embodiment, the plurality of segments 800 extend along the external surface 702 of the upper 701 between the front distal end 708 and the rear distal end 710. For example, the plurality of segments 800 may extend in a heel-toe direction 720 through at least portions of the forefoot region 762, the midfoot region 764, and the heel region 766. In some embodiments, the plurality of segments 800 may be arranged on both the medial side 770 and the lateral side 768.

In the illustrated embodiment, the plurality of segments 800 are spaced from one another in the sole-instep direction 722 and extend varying distances along the heel-toe direction 720. For example, the segments arranged adjacent to the laces 796 may extend a shorter distance in the heel-toe direction than the segments arranged adjacent to the bottom portion 726. In the illustrated embodiments, at least one of the segments extends in the heel-toe direction 720 through the midfoot region 764 and into the heel region 766. In the illustrated embodiment, the segments 800 are arranged generally parallel to one another, but the parallel arrangement does not limit the segments 800 to straight lines. For example, in the illustrated embodiment, the segments 800 define a generally wavy segments.

In general, the segments 800 may be spaced from one another (e.g., in the sole-instep direction 722). In the illustrated embodiment, a segment spacing 808 defined between adjacent pairs of the segments 800 may be approximately equal. In some embodiments, the segment spacing 808 defined between adjacent pairs of the segments 800 varies from a segment spacing minimum to a segment spacing maximum. In some embodiments, a ratio between the segment spacing maximum and the segment spacing minimum may be between about 1 and about 5, or between about 1 and about 4, or between about 1 and about 3, or between about 2 and about 4. In general, varying the segment spacing 808 may vary the amount of reinforcement and/or stability provided to the upper 701 in on the portions of the external surface 702. The ratios between the segment spacing maximum and the segment spacing minimum may maintain a critical balance between increased and/or decreased stability/reinforcement while maintaining a pleasing aesthetic for the article of footwear 700.

In general, each of the plurality of segments 800 defines a shape and size. In some embodiments, the shape and size of each of the plurality of segments 800 may remain about constant over the framework 740. For example, the plurality of segments 800 each may define a segment height and a segment width. In some embodiments, the segment heights and the segment widths may be about equal.

In some embodiments, the segment heights (e.g., a maximum height defined by a segment in a direction normal to the external surface 702), the segment widths (e.g., a maximum width defined in a direction parallel to the external surface 702), and/or the segment shapes may vary over selective portions of the external surface 702 to provide increased or decreased stability/reinforcement to the upper 701. Alternatively or additionally, a shape of the plurality of segments 800 may vary (e.g., transition from triangular or frustoconical in cross-section to round or semicircular in cross-section) to provide increased stability/reinforcement.

For example, the segment height and/or the segment width may be increased in portions of the external surface 702 to provide increased stability/reinforcement. For example, the segment height and/or the segment width may be increased in the heel region 766 relative to the midfoot region 764 and/or the forefoot region 762 to provide increased stability in the heel region 766 where the upper 701 experiences less flexing during walking or running. In some embodiments, the segment height and/or the segment width may increase adjacent to the bottom portion 726. For example, the segment height and/or the segment width may increase as the plurality of segments 800 extend in the sole-instep direction 722 toward the bottom portion 726.

In some embodiments, the segment heights may vary from a minimum segment height to a maximum segment height. For example, the maximum segment height between about 1 and about 5 times larger than the minimum segment height, or between about 1 and about 4 times larger than the minimum segment height, or between about 1 and about 3 times larger than the minimum segment height, or between about 2 and about 4 times larger than the minimum segment height. The ranges between the maximum segment height and the minimum segment height described herein maintain a critical balance between increased and/or decreased stability/reinforcement while maintaining a pleasing aesthetic for the article of footwear.

In some embodiments, the segment widths may vary from a minimum segment widths to a maximum segment widths. For example, the maximum segment widths between about 1 and about 5 times larger than the minimum segment widths, or between about 1 and about 4 times larger than the minimum segment widths, or between about 1 and about 3 times larger than the minimum segment widths, or between about 2 and about 4 times larger than the minimum segment widths. The ranges between the maximum segment widths and the minimum segment widths described herein maintain a critical balance between increased and/or decreased stability/reinforcement while maintaining a pleasing aesthetic for the article of footwear.

In the illustrated embodiment, the midsole 742 may include a plurality of protrusions 816 that extend outwardly from a bottom surface 818 of the midsole 742. When the midsole 742 is received within the internal cavity 714, the portion of the midsole 742 arranged above the bottom surface 818 may be enclosed within the internal cavity 714 of the upper 701, and each of the protrusions 816 may extend through a corresponding one of the apertures 703 of the upper 701. In this way, for example, a portion of the midsole 742 may protrude through and be visible through the upper 701. In the illustrated embodiment, each of the protrusions 816 defines a generally hemispherical shape and is sized according to the corresponding aperture 703 through which it extends. In the illustrated embodiment, the midsole 742 may include a plurality of dimples that are recessed into the external surfaces of the protrusions 816 and a periphery of the midsole 742.

Figure 20:
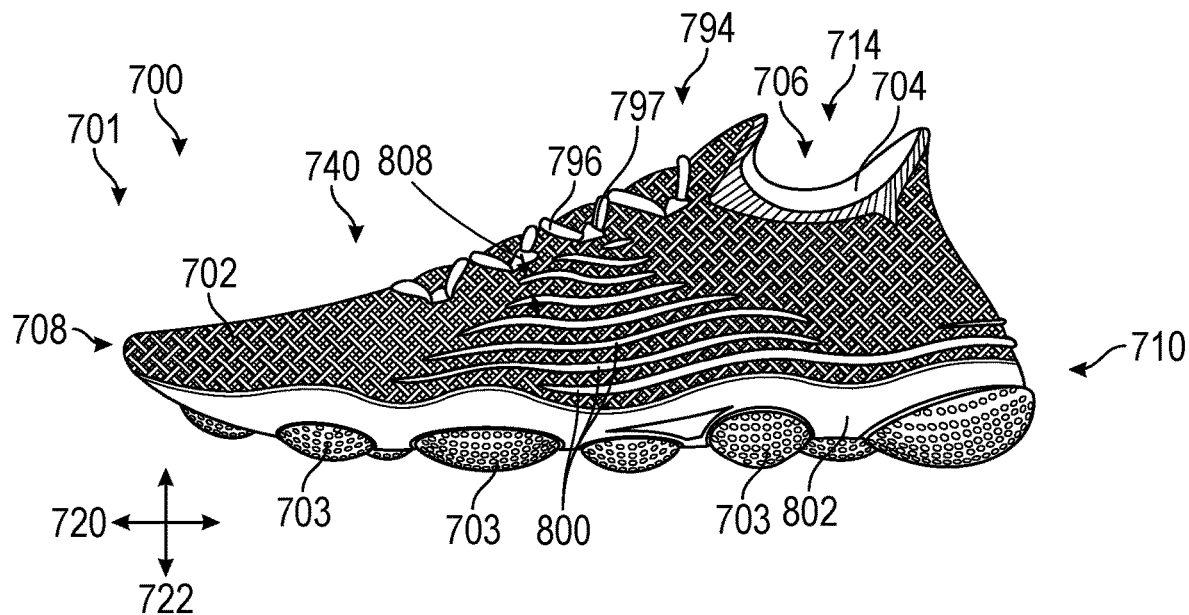
FIG. 20 is a medial side view of an article of footwear including the upper or sleeve of FIG. 18 and the midsole of FIG. 19.
Figure 21:
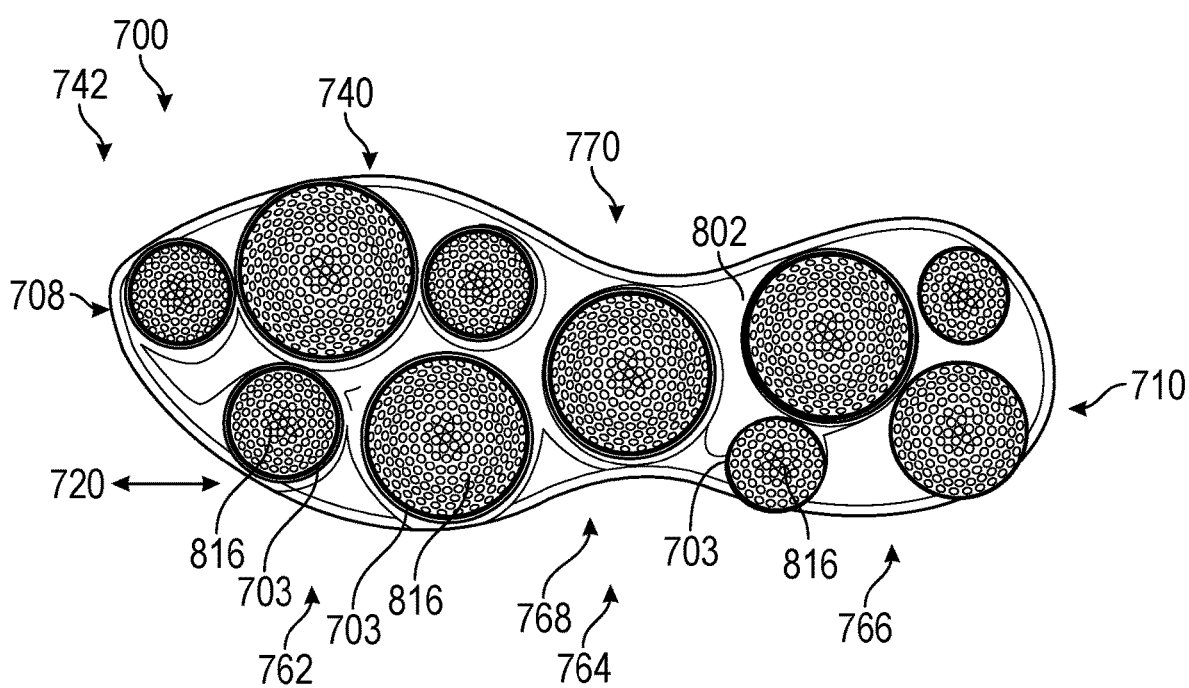
FIG. 21 is a bottom plan view of the article of footwear of FIG. 20.

With specific reference to FIGS. 20 and 21, the outsole 802 is printed, layer by layer, onto the bottom portion 726 of the external surface 702. In the illustrated embodiment, the outsole 802 is printed around the apertures 703 and the protrusions 816 extending therethrough. In some embodiments, the framework 740 as a whole may be printed layer by layer at onto the external surface 702. For example, one layer of the entire framework 740 (e.g., the outsole 802 and the plurality of segments 800) may be printed at a time until all of the layers of the framework 740 have been printed onto the portions of the external surface 702. In some embodiments, portions of the framework 740 may be printed layer by layer prior to other portions of the framework 740 being printed layer by layer. For example, the outsole 802 may be printed layer by layer and then the plurality of segments 800 may be printed layer by layer, or vice versa.

As described herein, the plurality of segments on a framework may take various shapes and sizes over particular portions of the upper. The following embodiments of the shapes and sizes of the segments may be applied to any of the plurality of segments described herein. For example, the embodiments described with reference to FIGS. 22-34 may apply to any of the segments 400, 600, or 800 or subsets of the segments 400, 600, or 800. In addition, the differences between the embodiments of FIGS. 22-34 may be applied over different subsets of the segments 400, 600, or 800. For example, the embodiment of FIG. 22 may apply to the heel region of the segments 400 and the embodiment of FIG. 25 may apply to the midfoot region of the segments 400. Any combination of the embodiments of FIGS. 22-34 may be incorporated into any portion or subset of the segments 400, 600, or 800.

FIG. 22 illustrates one embodiment of the segments 400, 600, or 800. The segments may include a set of segments 902 that each define a segment height H and a segment width W. The segment height H is defined as a maximum distance that the segment extends in a direction normal to the external surface that it is printed on (e.g., 302, 502, 702). In the illustrated embodiment, the set of segments 902 each define a generally triangular shape in cross-section, and define about the same segment height H and segment width W. As described herein, the size of the segments in a framework may be varied to provide customized reinforcement at different portions of an upper. For example, as illustrated in FIG. 23, the segments 400, 600, or 800 may further include a set of segments 904 that each define a segment height H that is less that the segment height H of the set of segments 902 and about the same segment width W as the set of segments 902. Alternatively or additionally, the segments 400, 600, or 800 may further includes a set of segments 906 that define a segment width W that is less than the segment width W of the set of segments 902 and about the same segment height H as the set of segments 902, as illustrated in FIG. 24. Alternatively or additionally, the segments 400, 600, or 800 may further includes a set of segments 908 that define a segment width W that is less than the segment width W of the set of segments 902 and a segment height H that is less than the set of segments 902, as illustrated in FIG. 25.

Figure 26:
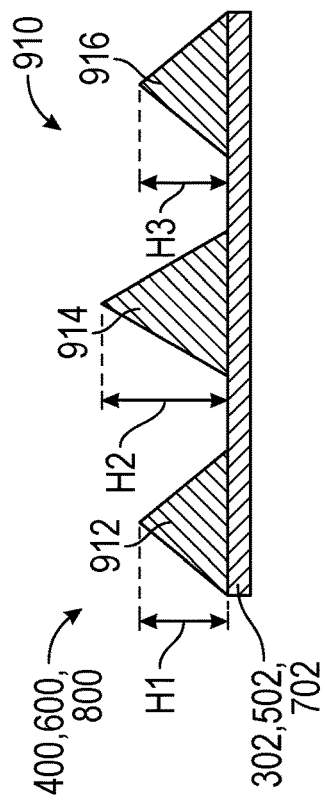
FIG. 26 is a schematic illustration of a set of segments with a variable height.
Figure 27:
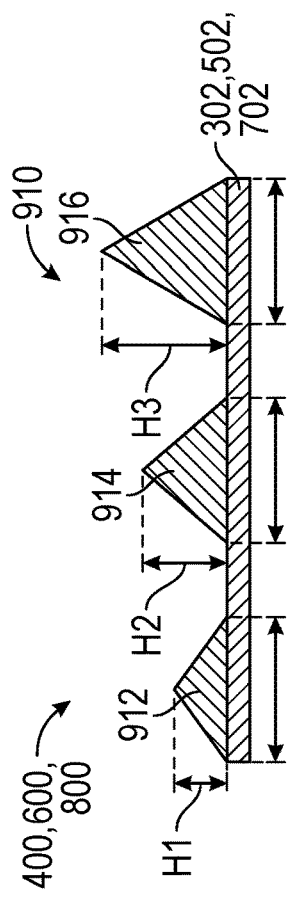
FIG. 27 is a schematic illustration of a set of segments with a peak height in a middle.

Turning to FIG. 26, the segments 400, 600, or 800 may include a set of segments 910 that vary in height. For example, the set of segments 910 may include a first segment 912 with a first segment height H1 at a first location on an external surface (e.g., 302, 502, 702), a second segment 914 with a second segment height H2 at a second location on the external surface, and a third segment 916 with a third segment height H3 at a third location on the external surface. In the illustrated embodiment, the third segment height H3 is greater than the second segment height H2, and the second segment height H2 is greater than the first segment height H1. In other embodiments, as illustrated in FIG. 27, the second segment height H2 is greater than the first segment height H1 and the third segment height H3.

Figure 28:
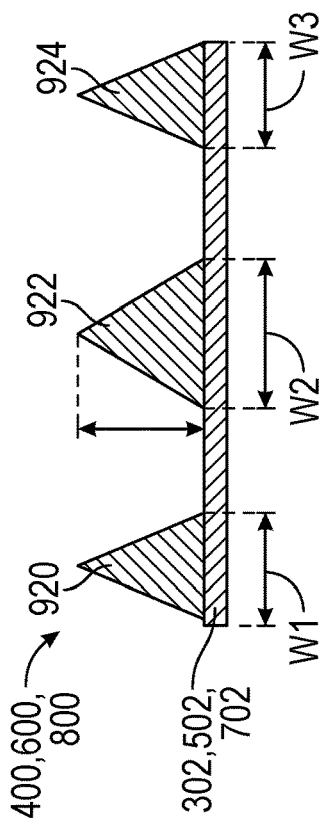
FIG. 28 is a schematic illustration of a set of segments with a variable width.
Figure 29:
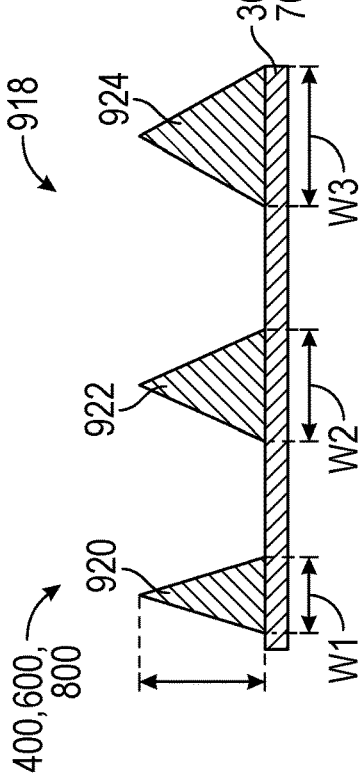
FIG. 29 is a schematic illustration of a set of segments with a peak width in a middle.

Turning to FIG. 28, the segments 400, 600, or 800 may include a set of segments 918 that vary in width. For example, the set of segments 918 may include a first segment 920 with a first segment width W1 at a first location on an external surface (e.g., 302, 502, 702), a second segment 922 with a second segment width W2 at a second location on the external surface, and a third segment 924 with a third segment width W3 at a third location on the external surface. In the illustrated embodiment, the third segment width W3 is greater than the second segment width W2, and the second segment width W2 is greater than the first segment width W1. In other embodiments, as illustrated in FIG. 29, the second segment width W2 is greater than the first segment width W1 and the third segment width W3. In some embodiments, the segments 400, 600, or 800 may include segments that vary in both segment height and segment width.

Figure 30:
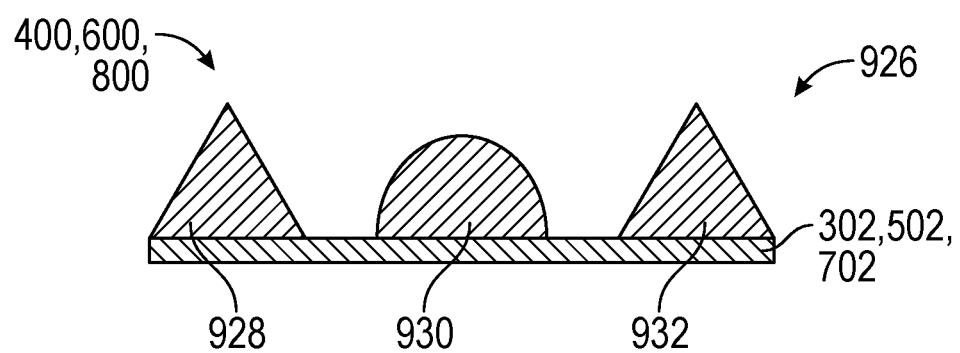
FIG. 30 is a schematic illustration of a set of segments with a variable shape.

In some embodiments, the segments 400, 600, or 800 may include segment with varying shapes. For example, FIG. 30 illustrates a set of segments 926 that includes a first segment 928 and a third segment 930 that define a generally triangular shape in cross-section, and a second segment 932 that defines a generally round, half-circle shape in cross-section. It should be appreciated that the variations in segment shape, height, and width may be applied in any combination to achieve a particular reinforcement of an upper. For example, variations in height and width may be applied to any shape or structure of the segments (e.g., frustoconical shape, polygonal shaped, arc shaped, etc.).

Any of the embodiments described herein may be modified to include any of the structures or methodologies disclosed in connection with different embodiments. Further, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

I claim:

1. An article of footwear, comprising:
    a sleeve formed by a knit material and defining a front distal end and a rear distal end, wherein the sleeve includes an external surface and an internal surface that defines an internal cavity;
    a midsole arranged within the internal cavity; and
    a framework printed, layer by layer, onto portions of the external surface, wherein the framework includes a plurality of segments and an outsole, the outsole being arranged on a bottom portion of the external surface and the plurality of segments extend along the external surface of the sleeve between the front distal end and the rear distal end,
    wherein the external surface is opposite the internal surface,
    wherein the outsole is directly attached to the external surface,
    wherein at least a portion of the plurality of segments extend along and directly contact the bottom portion of the external surface, and
    wherein the bottom portion of the external surface extends from a lateral side to a medial side of the sleeve to be configured to extend underneath a user's foot when positioned in the internal cavity.

2. The article of footwear of claim 1, wherein the sleeve defines an upper portion and a midsole portion.

3. The article of footwear of claim 2, wherein the knit material comprises a first knit material spanning the upper portion and a second knit material spanning the midsole portion.

4. The article of footwear of claim 3, wherein the second knit material is at least partially transparent so that a portion of the midsole is externally visible through the midsole portion of the sleeve.

5. The article of footwear of claim 1, wherein the plurality of segments include a first set of lines and a second set of lines.

6. The article of footwear of claim 5, wherein the first set of lines are generally parallel to one another, and the second set of lines are generally parallel to one another.

7. The article of footwear of claim 5, wherein the first set of lines intersect the second set of lines to form a crisscross pattern.

8. The article of footwear of claim 1, wherein the plurality of segments are aligned with one another and extend in a heel-toe direction along the sleeve.

9. The article of footwear of claim 1, wherein a portion of the plurality of segments are movable relative to the sleeve to enable a lace to be threaded through the framework.

10. An article of footwear, comprising:
    an upper including an upper portion and a midsole portion, wherein the upper portion is fabricated from a first knit material and the midsole portion is fabricated from a second knit material;

a midsole arranged within an internal cavity of the upper;

a framework printed, layer by layer, onto the upper, wherein the framework defines a matrix pattern including row segments and column segments that extend along an external medial side of the upper and an external lateral side of the upper; and an outsole printed, layer by layer, onto a sole side of the upper, wherein the outsole is connected to the framework at the external medial side and the external lateral side, wherein at least a portion of the row segments and the column segments extend along and directly contact a bottom portion that spans between the external medial side of the upper and the external lateral side of the upper, the bottom portion being configured to extend underneath a user's foot when positioned in the internal cavity.

11. The article of footwear of claim 10, wherein the framework is formed integrally with the outsole.

12. The article of footwear of claim 10, wherein a row spacing defined between adjacent pairs of the row segments is about equal.

13. The article of footwear of claim 10, wherein a row spacing defined between adjacent pairs of the row segments varies from a row spacing minimum to a row spacing maximum.

14. The article of footwear of claim 10, wherein a column spacing defined between adjacent pairs of the column segments is about equal.

15. The article of footwear of claim 10, wherein a column spacing defined between adjacent pairs of the column segments varies from a column spacing minimum to a column spacing maximum.

* * * * *